(12) United States Patent
Sherriff et al.

(10) Patent No.: US 10,551,814 B2
(45) Date of Patent: Feb. 4, 2020

(54) GENERIC SHADOWING IN INDUSTRIAL PROCESS PLANTS

(71) Applicant: FISHER-ROSEMOUNT SYSTEMS, INC., Round Rock, TX (US)

(72) Inventors: Godfrey R. Sherriff, Austin, TX (US); Gary Law, Georgetown, TX (US); David Mark Smith, Round Rock, TX (US); David R. Denison, Austin, TX (US); Brandon Hieb, Cedar Park, TX (US)

(73) Assignee: FISHER-ROSEMOUNT SYSTEMS, INC., Round Rock, TX (US)

(*) Notice: Subject to any disclaimer, the term of this patent is extended or adjusted under 35 U.S.C. 154(b) by 219 days.

(21) Appl. No.: 15/655,578

(22) Filed: Jul. 20, 2017

(65) Prior Publication Data
US 2019/0025790 A1  Jan. 24, 2019

(51) Int. Cl.
*G06F 9/44* (2018.01)
*G05B 19/05* (2006.01)

(52) U.S. Cl.
CPC .. *G05B 19/056* (2013.01); *G05B 2219/14006* (2013.01); *G05B 2219/15011* (2013.01)

(58) Field of Classification Search
CPC ... G05B 19/056; G05B 19/418; G05B 19/042
See application file for complete search history.

(56) References Cited

U.S. PATENT DOCUMENTS

| | | | |
|---|---|---|---|
| 6,738,388 | B1 | 5/2004 | Stevenson et al. |
| 7,519,083 | B2 | 4/2009 | Stevenson et al. |
| 2011/0172965 | A1 | 7/2011 | McIntyre et al. |
| 2015/0205542 | A1* | 7/2015 | Antony ............... G06F 9/45558 711/162 |
| 2018/0309818 | A1* | 10/2018 | Park ..................... H04L 67/10 |

FOREIGN PATENT DOCUMENTS

| | | |
|---|---|---|
| GB | 2 341 524 A | 3/2000 |
| GB | 2 348 021 A | 9/2000 |

OTHER PUBLICATIONS

Search Report for Application No. GB1810450.5, dated Nov. 23, 2018.

* cited by examiner

*Primary Examiner* — Hanh Thi-Minh Bui
(74) *Attorney, Agent, or Firm* — Marshall, Gerstein & Borun LLP

(57) ABSTRACT

Generic shadowing allows a shadowing device in a process plant to automatically discover, without pre-configuration or pre-definition, and without the use of a configuration tool, source control objects that are hosted at other devices and that are to be shadowed. Source control objects may utilize any data type, format, structure, language, etc. The shadowing device includes a shadow manager and a set of primitive components defining simple data types that are utilized to discover the configurations/definitions and data types of source control objects, and includes a shadow library in which signatures of discovered source control objects are stored. Signatures are instantiated and used by the shadowing device to provide dynamic data to recipient devices, applications, and/or control objects in the process control system, where the dynamic data is a mirror of data that is observed first-hand by the source control objects during their on-line operations at their host devices.

36 Claims, 4 Drawing Sheets

GENERIC SHADOWING IN INDUSTRIAL PROCESS PLANTS

TECHNICAL FIELD

This patent relates generally to industrial process plants and process control systems, and more particularly, to methods and systems for providing a generic shadowing in process plants without a priori knowledge of configurations.

BACKGROUND

In industrial process plants, process control systems such as Distributed Control Systems (DCSs), Safety Instrumented Systems (SISs), and/or Programmable Logic Controllers (PLCs) operate to control one or more industrial processes executing therein to manufacture, refine, transform, generate, or produce physical materials or products such as paper, pharmaceuticals, petroleum products, plastics, packaging, chemicals, etc. from raw materials. Distributed Control Systems typically include one or more process controllers communicatively coupled to one or more field devices via analog, digital or combined analog/digital buses, or via one or more wireless communication links or networks. The field devices, which may be, for example, valves, valve positioners, switches and transmitters (e.g., temperature, pressure, level and flow rate sensors, and the like), are located within the process environment and generally perform physical or process control functions such as opening or closing valves, measuring process and/or environmental parameters such as temperature, flow, or pressure, etc., to control one or more processes executing within the process plant or system to thereby generate the physical materials or products from raw source materials. Smart field devices, such as the field devices conforming to the well-known Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices (e.g., via buses, wired communication networks, and/or wireless communication networks) and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system to thereby control at least a portion of one or more industrial processes running or executing within the plant or system. I/O devices, which are also typically located within the plant environment, typically are disposed between a controller and one or more field devices, and enable communications there between, e.g., by converting electrical signals into digital values and vice versa. As utilized herein, field devices, controllers, and I/O devices are generally referred to as "process control devices," and are generally located, disposed, or installed in a physical field environment of a process plant.

Some industrial process plants include a safety instrumented system ("SIS"), which generally operates to detect significant safety related problems within the process plant and to automatically close or open valves, remove power from devices, switch flows within the plant, etc., when a problem occurs which might result in or lead to a serious hazard in the plant, such as a spill of toxic chemicals, an explosion, etc. These safety instrumented systems typically have one or more separate controllers apart from the standard process control controllers, which referred to herein as safety system logic solvers or safety controllers, which are connected to safety field devices via buses, communication lines, or wireless networks that are separate from those used for process control and installed within the process plant. The logic solvers execute safety instrumented function (SIF) routines that use the safety field devices to detect process conditions associated with significant events, such as the position of certain safety switches or shutdown valves, overflows or underflows in the process, the operation of important power generation or control devices, the operation of fault detection devices, etc., to thereby detect events within the process plant. When an event, which may be a single condition or the simultaneous occurrence of two or more conditions, is detected, the safety controller takes some action to limit the detrimental nature of the event, such as closing valves, turning devices off, removing power from sections of the plant, etc. Generally, these actions include switching safety devices into a tripped or "safe" mode of operation which is designed to prevent a serious or hazardous condition within the process plant.

Some industrial or process plants additionally or alternatively include one or more PLC (Programmable Logic Controller) control systems. Generally speaking, PLCs are high-reliability automation controllers that are suitable for harsh field environments and that are designed to consistently produce output results in response to input conditions within a limited time constraint. Within PLC control systems, PLCs may connect to various sensors, actuators, and/or other field devices as well as, in some implementations, other controllers, from which inputs are received and processed using control logic with which the PLC has been programmed, and to which resulting outputs are transmitted to thereby control at least a portion of an industrial process within a process plant. Typically, PLCs are programmed or configured using ladder-style logic, although some PLCs may be programmed/configured using state logic, function block diagrams, sequence flowcharts, structured text, instruction lists, other types of programming languages, etc.

Thus, various process control systems (such as DCS, SIS, and PLC discussed above, and/or other types of process control systems) operate within an industrial process plant to control one or more industrial processes executing in real-time or run-time therein via various process control devices. As previously discussed, the term "process control devices" generally refers to field devices, I/O devices, and controllers of a DCS; safety field devices, I/O devices, and safety logic solvers or safety controllers of an SIS; and/or programmable logic controllers and field devices PLC-based control systems, any number of which may be included in a process plant operating to manufacture, refine, transform, generate, or produce an industrial product or material.

Information from various process control devices of the process control system(s) of a process plant may be made available over a data highway or communication network to one or more other hardware devices, such as operator workstations, personal computers or other types of computing devices with user interfaces, data historians, report generators, centralized databases, or other centralized administrative computing devices that are typically placed in control rooms or other locations away from the harsher, physical field environment of the plant, e.g., in a back-end environment of the process plant. Each of these hardware devices typically is centralized across the process plant or across a portion of the process plant. These hardware devices run applications that may, for example, enable a control or a safety system operator to perform functions with respect to controlling a process and/or operating the process plant, such as changing settings of the process control routine or a safety routine; modifying the operation of the control modules within the process controllers, the safety system controllers, the field devices, etc. e.g., by changing their respective configurations; viewing the current state of the process; viewing alarms generated by field devices, the process controllers, or the safety system controllers; simulating the operation of the process for the purpose of training personnel or testing the process control software; keeping and updating a configuration database, etc. The data highway utilized by the hardware devices, controllers, and field devices may include a wired communication path, a wireless communication path, or a combination of wired and wireless communication paths.

As is commonly known, process control devices typically are configured off-line using function block diagrams (FBDs) and/or other suitable configuration tools. Such configuration tools allow the definition and/or the configuration of function blocks and/or control modules, where control modules typically comprise a particular arrangement of a particular set of function blocks. Control objects corresponding to the configured function blocks and/or to the configured control modules are downloaded and instantiated into respective process control devices. When the downloaded control objects are instantiated and executed at their host process control devices, the control objects cause their host process control devices to operate in accordance with their respective configurations to control at least a portion of a process within the process plant.

In some arrangements, control objects of an FBD (e.g., which may include one more function blocks, control modules, etc.) may be distributed amongst several process control devices. When the control objects are instantiated at their respective process control devices, said control objects operating in concert across multiple process control devices may cause a particular control logic to execute to control at least a portion of the process. In these distributed configurations, one particular process control device may be responsible for presenting a collective view of the control logic that is distributively operating amongst multiple process control devices, e.g., for the purposes of presentation at a user interface and/or for consumption by another device of the process control system. Such a responsibility or task is generally referred to herein as "shadowing," and as such the particular device responsible for the collective view of the control logic may be referred to herein as a "shadowing device," and others of the multiple process control devices that are operating to execute the control logic (which are is represented by and/or referred to by the shadowing device to consumers) may be referred to herein as "shadowed devices." Generally speaking dynamic data and other information that is generated, received, and/or observed by the shadowed devices is mirrored at the shadowing device so that the mirrored data is made available at the shadowing device to other devices, modules, function blocks, control objects, and/or other consumers of such data that are included in the process control system.

It is noted that a shadowing device need not be a separate and distinct physical device from other devices. In some implementations, for example, the shadowing device may be an isolated software module that is integral to and executing within a shadowed device or within another device, and the isolated software module may act as a bridge between the native (shadowed) control object and the consumers of data observed by the shadowed control object. It is also noted that the collective view presented by the shadowing device to various consumers within the process control system generally includes real-time, dynamic data that is generated, received, and/or otherwise by shadowed devices while the shadowed devices are on-line and operating in real-time or on-line to control at least a portion of one or more processes executing in the process plant. As such, the various consumers of data that is produced or observed by the control logic or portions thereof need not communicate directly with each process control device participating in the execution of the control logic, but instead may simply communicate with the shadowing device to obtain dynamic, real-time data that is generated, received, and/or observed by multiple shadowed devices participating in the control logic. Thus, in effect, the shadowing device provides real-time data transfer from the shadowed devices to the various consumers of the data.

Shadowing devices may shadow any one or more function blocks, one or more control modules, and/or combinations thereof. For example, when a shadowing device hosts (e.g., provides a collective view of) a control module that comprises one or more function blocks executing in one or more other process control devices, the shadowing device is said to be "shadowing the control module" or "shadowing the module." Shadowing a control module may be performed for the purposes of user interaction and/or data transfer into and out of the control module, for example.

In another example, a shadowing device hosts (e.g., provides a collective view of) a function block, a portion of which is executed by the physical device in which the shadowing device resides, and another portion of which is executed by another process control device. In this example, the shadowing device is said to be "shadowing the function block." For instance, a Foundation Fieldbus control strategy may be executed by one or more function blocks executing at a process controller and one or more other function blocks executing in various field devices. The process controller may shadow the one or more other function blocks that are executing in the various field devices, e.g., for purposes of user interaction, data transfer into and out of the function blocks, etc.

Example implementations of known techniques for shadowing control modules and function blocks in process control systems and process plants is found in U.S. Pat. No. 6,738,388 and in U.S. Pat. No. 7,519,083, the contents of which are hereby included by reference herein in their entireties.

SUMMARY

In an embodiment, a shadowing device included in a process plant includes one or more processors, and one or more interfaces communicatively connecting the shadowing device to a shadowed device, where the shadowing device and the shadowed device are included in a process control system operating to control, and real-time, an industrial process in the process plant.

The shadowing device also includes one or more tangible memory storing a shadow library, and a shadow manager comprising computer-executable instructions that are stored on the one or more tangible memories and that, when executed by the one or more processors, cause a shadowing device to receive, from the shadowed device, an indication of an instantiated source function block (e.g., a source function block that has been configured in downloaded into the shadowed device). Additionally, the computer-executable instructions cause the shadowing device to, when a signature corresponding to the source function block is not stored in the shared library, (i) create, based on the received indication of the source function block, a signature of the source function block, (ii) store the created signature of the source function block in the shadow library, and (iii) instantiate the created signature of the source function block, thereby generating a shadow of the source function block at the shadowing device. Further, the computer-executable instructions cause the shadowing device to, when a signature corresponding to the source function block is stored in the shared library, (i) determine, based on the received indication of the source function block, a discrepancy between the source function block and the stored signature corresponding to the source function block, (ii) update the stored signature corresponding to the source function block based on the discrepancy, (iii) store the updated signature of the source function block in the shadow library, and (iv) instantiate the updated signature of the source function block, thereby generating the shadow of the source function block at the shadowing device.

The one or more processors of the shadowing device are configured to use the shadow of the source function block to mirror dynamic data that is observed by the instantiated source function block executing at the shadowed device during the real-time control of the industrial process in the process plant, and provide the mirrored dynamic data to one or more other devices and/or function blocks included in the process control system, thereby shadowing, by the shadowing device, the instantiated source function block executing at the shadowed device.

In an embodiment, a method for shadowing a device in a process plant includes receiving, at a shadowing device from a shadowed device, an indication of an instantiated source function block at the shadowed device (e.g., a source function block that has been configured and downloaded into the shadowed device), where the shadowing device and the shadowed device are included in a process control system operating to control, in real-time, an industrial process in the process plant. The method additionally includes determining, by the shadowing device, that a signature corresponding to the source function block is not stored at the shadowing device, and based on the determination that the signature corresponding to the instantiated source function block is not stored at the shadowing device, discovering the signature of the source function block and storing the signature of the source function block in a shadow library of the shadowing device. Further, the method includes mirroring, at the shadowing device and by using the signature of the source function block, dynamic data that is generated and/or received by the instantiated source function block at the shadowed device during real-time control of the industrial process; and providing, by the shadowing device, the mirrored dynamic data to other function blocks and/or devices included in the process control system, thereby shadowing the instantiated source function block that is executing at the shadowed device.

DETAILED DESCRIPTION

Figure 1:
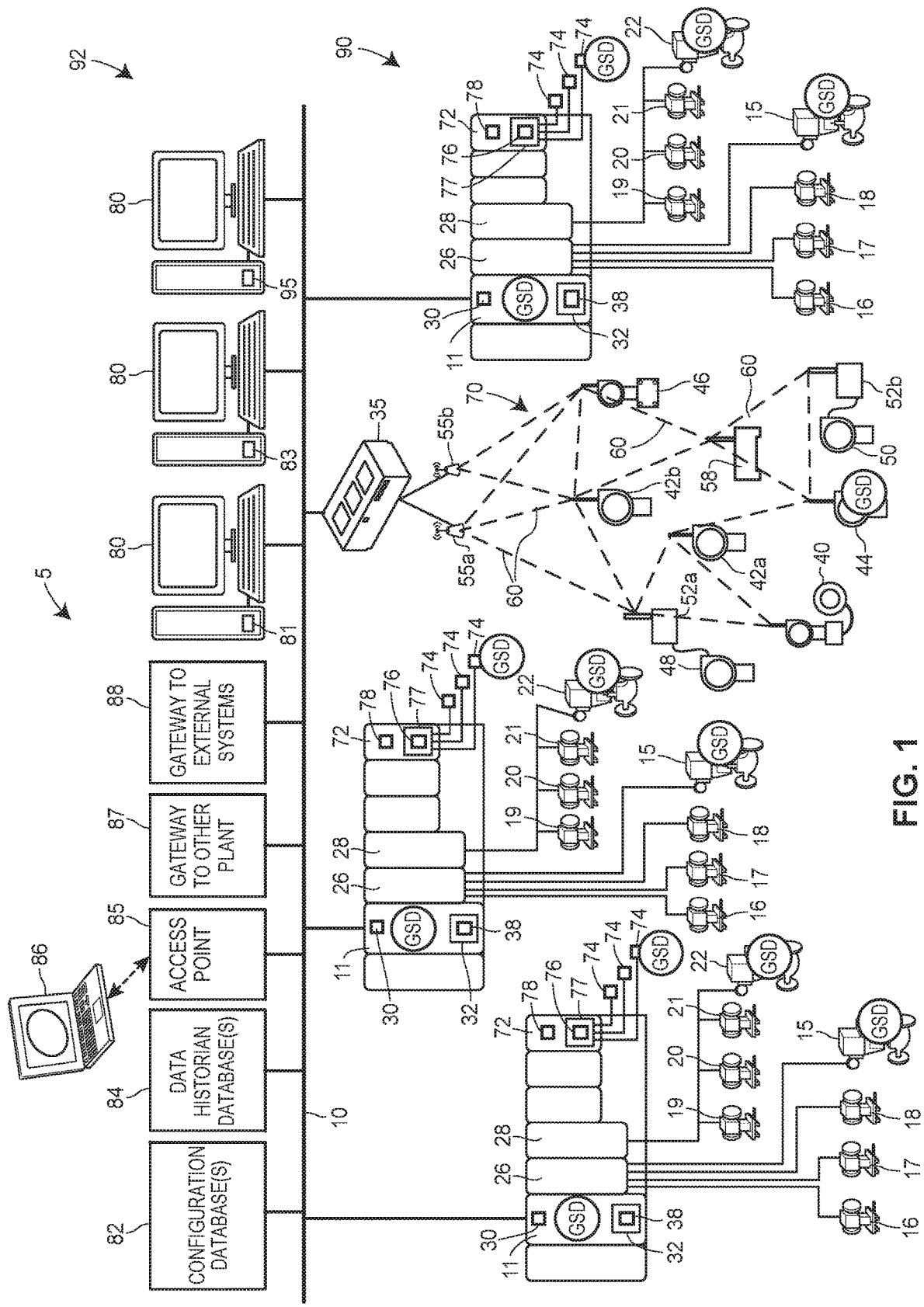
FIG. 1 depicts a block diagram illustrating an example process plant in which generic shadowing may be implemented and/or included.

FIG. 1 illustrates an example process plant 5 including one or more process control systems that operate to control one or more industrial processes in real-time and in which any number of the generic shadowing methods, systems, apparatuses, devices, mechanisms, and/or techniques described herein may be implemented. The one or more process control systems of the process plant 5 may include one or more Distributed Control Systems (DCSs), Safety Instrumented Systems (SISs), Programmable Logic Controllers (PLCs), and/or other types of process control systems, each of which may include respective process control devices, however, for ease of depiction, the process plant 5 is illustrated in FIG. 1 as including a process control system that is a DCS and a process control system that is an SIS, as will be described in more detail below. However, one skilled in the art will understand that any of the generic shadowing methods, systems, apparatuses, devices, mechanisms, and/or techniques described herein may be easily implemented in process plants that include more than one DCS, more than one SIS, one or more PLCs, and/or one or more other types of process control systems.

Generally speaking, though, the process plant 5, when commissioned and operating on-line, includes one or more wired or wireless process control devices, components, or elements that operate cooperatively to control one or more processes executing within the process plant 5, which, for example, may result in the generation of a physical, industrial product or material, such as paper products, pharmaceuticals, petroleum products, packaging, plastics, etc. from raw materials. As such, at least some of the process control devices of the process plant 5 may perform various physical functions, such as opening and closing valves, sensing temperature, sensing flow, measuring volumes, densities, and/or other characteristics of materials, etc. The process plant 5 and process control system(s) included therein may also include one or more wired communication networks, wireless communication networks, and/or centralized databases, such as continuous, batch, asset management, configuration, historian, and other types of databases.

As previously discussed, the process control devices included in the process control system(s) of the process plant 5 may include DCS field devices, I/O devices, and controllers; SIS safety field devices, I/O devices, and safety controllers or logic solvers; and programmable logic controllers (PLCs), to name a few. Typically, process control devices that support the generic shadowing techniques described herein are smart process control devices, and as such include one or more non-transitory, tangible memories on which their respective configurations and/or other data is stored, and also include one or more processors that execute the instantiated configurations during real-time or on-line operations to perform the behaviors defined therein, such as control loops, alarming, and other control functions. Additionally, process control devices typically include one or more communication interfaces to one or more process control networks to thereby send and receive process control signals of any suitable industrial control protocol, such as HART, WirelessHART, Fieldbus, Profibus, etc., to and from other process control devices disposed within the physical field environment of the process plant 5, and/or to and from back-end environments of the process plant 5, as is discussed in more detail below.

Typically, process control devices are configured off-line using function block diagrams (FBDs) and/or other suitable configuration tools. Such configuration tools allow the definition and/or the configuration of one or more function blocks and/or one or more control modules. Control objects corresponding to the configured function blocks and/or configured control modules are downloaded to and instantiated at respective process control devices within the field environment of the plant 5. When the instantiated control objects are executed at their host process control devices during real-time or on-line operations, the control objects cause the host devices to operate in accordance with their respective configurations to control at least a portion of one or more processes within the process plant 5, e.g., by receiving signals, performing one or more control functions based upon the received signals, transmitting control signal resulting therefrom, etc.

In known shadowing techniques that are currently utilized in process control systems, a shadowing device is configured to include or to otherwise reference configurations of control objects that it is to shadow during on-line operations. By using a configuration tool or other suitable tool, the configuration of the shadowing device is defined to include or reference the configurations of control objects (e.g., corresponding to function blocks, control modules, etc.) that the shadowing device is to shadow during on-line operations. Said definitions and/or configurations of the shadowing device and of the shadowed are stored in a configuration database, and then downloaded or instantiated into the shadowing device for execution during real-time process plant operations so that the shadowing device perform their shadowing responsibilities as defined by the configuration of the shadowing device that includes or references the configurations of the shadowed control objects. As such, in currently known process control systems, detailed knowledge of control objects that are desired to be shadowed must be known and configured into the configurations of their shadowing devices a priori. As such, it is extremely cumbersome, if not impossible, to introduce changes to existing shadowed control objects and/or to introduce new, shadowed control objects into the process control system without prior detailed knowledge and configuration of said shadowed objects and their respective shadowing devices. In some scenarios, shadowing devices may even need to be taken off-line so that modified and/or new control objects of shadowed devices are correctly defined or referenced in the configuration of the shadowing device.

On the other hand, the novel generic shadowing techniques, systems, methods, apparatuses, devices, and mechanisms disclosed herein allow the automatic discovery of shadowed control objects (e.g., function blocks and/or control modules) by the shadowing devices without pre-configuration or -predefinition, so that shadowing devices are automatically configured (e.g., during real-time or on-line operations of the process plant) to properly present and/or transfer data of shadowed objects to user interfaces and/or various other portions of the process control system that are consumers of the data observed by the shadowed control objects, which may be dynamic data that is generated, received, or otherwise observed by the shadowed control objects during their on-line execution in the process plant 5.

The example process plant 5 depicted in FIG. 1 includes a DCS process control system that includes one or more process controllers that receive signals indicative of process measurements made by field devices and/or other information sensed by the field devices or provided by other process controllers. The controllers process the information received from the field devices by using one or more control routines which generate control signals that are sent over wired or wireless process control communication links or networks to other controllers and/or field devices to control the operation of a process in the plant 5. Typically, at least one field device performs a physical function (e.g., opening or closing a valve, increasing or decreasing a temperature, taking a measurement, sensing a condition, etc.) to control the operation of a process. Some types of field devices communicate directly with controllers, and other types of field devices communicate with controllers using input/output (I/O) devices. Process control devices may be wired or wireless, and any number and combination of wired and wireless process controllers, field devices and I/O devices may be included in the process plant environment or system 5.

For example, the system of FIG. 1 depicts a process control system 5 having multiple process controllers 11, in which some of the process controllers 11 are communicatively connected to field devices 15-22 via input/output (I/O) cards 26 and 28 in a wired manner. Moreover, some of the process controllers 11 are communicatively connected in a wireless manner or partially wireless manner to field devices 40-46 via a wireless gateway 35 and a process control data highway 10. The process control data highway 10 may include one or more wired and/or wireless communication links, and may be implemented using any desired or suitable or communication protocol such as, for example, an Ethernet protocol. In some configurations (not shown), one or more of the process controllers 11 may be communicatively connected to the wireless gateway 35 using one or more communications networks other than the data highway or communication network 10, such as by using any number of other wired or wireless communication links that support any other communication protocols, e.g., Wi-Fi or other IEEE 802.11 compliant wireless local area network protocols, mobile communication protocols (e.g., WiMAX, LTE, or other ITU-R compatible protocol), the Bluetooth® protocol, the HART® protocol, the WirelessHART® protocol, the Profibus protocol, the FOUNDATION® Fieldbus protocol, etc.

The controllers 11, which may be, by way of example, DeltaV™ controllers sold by Emerson Process Management, may operate to implement a batch process or a continuous process using at least some of the field devices 15-22 and 40-46. In addition to being communicatively connected to the process control data highway 10, the controllers 11 may be communicatively connected to at least some of the field devices 15-22 and 40-46 using any desired hardware and software associated with, for example, standard 4-20 mA devices, I/O cards 26, 28, and/or any smart communication protocol such as the FOUNDATION® Fieldbus protocol, the HART® protocol, the WirelessHART® protocol, etc. In FIG. 1, the controllers 11, the field devices 15-22 and the I/O cards 26, 28 are wired devices, and the field devices 40-46 are wireless field devices. Of course, the wired field devices 15-22 and wireless field devices 40-46 could conform to any other desired standard(s) or protocols, such as any wired or wireless protocols, including any standards or protocols developed in the future.

The process controllers 11 of FIG. 1 each define a separate node of the process control system and include a respective processor 30 that implements or oversees one or more respective process control routines 38 (e.g., that are stored in a memory 32), with such process control routines 38 generally being referred to herein as control modules. The processor 30 is configured to communicate with the field devices 15-22 and 40-46 and with other nodes communicatively connected to the controllers 11. It should be noted that any control routines or modules 38 described herein may have parts thereof implemented or executed by different controllers or other devices if so desired, that is, the executing control logic may be distributed amongst multiple process control devices. Likewise, the control routines or control modules 38 described herein which are to be implemented within the process control system 5 may take any form, including software, firmware, hardware, etc. Additionally, the control routines 38 may be implemented in any desired software format, such as using object oriented programming, ladder logic, sequential function charts, function block diagrams, or using any other software programming language or design paradigm. The control routines or control modules 38 may be stored in any desired type of memory 32, such as random access memory (RAM), or read only memory (ROM). Likewise, the control routines 38 may be hard-coded into, for example, one or more EPROMs, EEPROMs, application specific integrated circuits (ASICs), or any other hardware or firmware elements. Thus, the controllers 11 may be configured to implement a control strategy or control routine in any desired manner.

In one case, the controllers 11 implement a control strategy using control modules 38 defined by what are commonly referred to as function blocks, where each function block is an object or other part (e.g., a subroutine) of an overall control routine or control logic, and operates in conjunction with other function blocks (via communications called links) to implement process control loops within the process control system 5. Control based function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 5. Of course, hybrid and other types of function blocks exist. Function blocks may be stored in and executed by the controllers 11, which is typically the case when these function blocks are used for, or are associated with standard 4-20 mA devices and some types of smart field devices such as HART® devices, or may be stored in and implemented by the field devices themselves, which can be the case with FOUNDATION® Fieldbus devices. Thus, as will be understood, the controllers 11 may include one or more control routines or modules 38 that may implement one or more control loops which are performed by executing one or more of the function blocks.

The wired field devices 15-22 may be any types of devices, such as sensors, valves, transmitters, positioners, etc., while the I/O cards 26 and 28 may be any types of I/O devices conforming to any desired communication or controller protocol. In FIG. 1, the field devices 15-18 are standard 4-20 mA devices or HART® devices that communicate over analog lines or combined analog and digital lines to the I/O cards 26, while the field devices 19-22 are smart devices, such as FOUNDATION® Fieldbus field devices, that communicate over a digital bus to the I/O cards 28 using a FOUNDATION® Fieldbus communications protocol. In some embodiments, though, at least some of the wired field devices 15-22 and/or at least some of the I/O cards 26, 28 additionally or alternatively may communicate with the controllers 11 using the process control data highway 10 and/or by using other suitable control system protocols (e.g., Profibus, DeviceNet, Foundation Fieldbus, ControlNet, Modbus, HART, etc.).

In the system of FIG. 1, the wireless field devices 40-46 communicate via a wireless process control communication network 70 using a wireless protocol, such as the WirelessHART® protocol. Such wireless field devices 40-46 may directly communicate with one or more other devices or nodes of the wireless network 70 that are also configured to communicate wirelessly (using the wireless protocol or another wireless protocol, for example). To communicate with one or more other nodes that are not configured to communicate wirelessly, the wireless field devices 40-46 may utilize the wireless gateway 35 connected to the process control data highway 10 or to another process control communications network. The wireless gateway 35 provides access to various wireless devices 40-58 of the wireless communications network 70. In particular, the wireless gateway 35 provides communicative coupling between the wireless devices 40-58, the wired devices 11-28, and/or other nodes or devices of the process control plant 5. For example, the wireless gateway 35 may provide communicative coupling by using the process control data highway 10 and/or by using one or more other communications networks of the process plant 5.

Similar to the wired field devices 15-22, the wireless field devices 40-46 of the wireless network 70 perform physical control functions within the process plant 5, e.g., opening or closing valves, taking measurements of process parameters, etc. The wireless field devices 40-46, however, are configured to communicate using the wireless protocol of the network 70. As such, the wireless field devices 40-46, the wireless gateway 35, and other wireless nodes 52-58 of the wireless network 70 are producers and consumers of wireless communication packets.

In some configurations of the process plant 5, the wireless network 70 includes non-wireless devices. For example, in FIG. 1, a field device 48 is depicted as a legacy 4-20 mA device and a field device 50 is depicted as a wired HART® device. To communicate within the network 70, the field devices 48 and 50 are connected to the wireless communications network 70 via a wireless adaptor 52a, 52b. The wireless adaptors 52a, 52b support a wireless protocol, such as WirelessHART, and may also support one or more other communication protocols such as Foundation® Fieldbus, PROFIBUS, DeviceNet, etc. Additionally, in some configurations, the wireless network 70 includes one or more network access points 55a, 55b, which may be separate physical devices in wired communication with the wireless gateway 35 or may be provided with the wireless gateway 35 as an integral device. The wireless network 70 may also include one or more routers 58 to forward packets from one wireless device to another wireless device within the wireless communications network 70. In the example system of FIG. 1, the wireless devices 40-46 and 52-58 communicate with each other and with the wireless gateway 35 over wireless links 60 of the wireless communications network 70, and/or via the process control data highway 10.

Still further, the process plant 5 also includes an SIS control system which comprises safety logic solvers or controllers 72 and safety field devices 74. In particular, one or more of the process controllers 11 are connected to safety logic solvers or safety system controllers 72, which, in turn, are connected to safety system field devices or assets 74. The safety controllers 72 may be connected directly to the safety field devices 74 (as shown in FIG. 1) or may be connected to the safety field devices 74 via one or more I/O devices (not shown in FIG. 1) and, in any event, may be connected to the safety field devices 74 via any wired or wireless communication links. Likewise, the safety field devices 74 may be any types of devices that perform any type of physical function or sensing function within the plant for safety purposes, and may conform to any of the communication protocols described above or other communication protocols. Likewise, the safety controllers 72 may store one or more safety system logic modules 76 (which are also referred to interchangeably herein as "safety system modules" or "safety system control modules"), in a memory 77, and may execute these safety system modules 76 on a processor 78. The safety system logic modules 76 may be configured in any of the manners described above for the process control modules 38 and may perform any desired functions within the safety system, including user interface functions such as alarming functions. If desired, the safety logic controllers 72 may be in the same or different nodes as the process controllers 11.

The process plant or the process control system 5 of FIG. 1 also includes one or more operator workstations 80, each of which is communicatively connected to the data highway 10, and each of which includes a memory and one or more computer processors. Operators and other personnel may use the operator workstations 80 to configure the plant 5 and elements within the plant 5 and/or to view and monitor run-time operations of the process plant 5, as well as take any diagnostic, corrective, maintenance, and/or other actions that may be required. At least some of the operator workstations 80 may be located in various, protected areas in or near the plant 5, and in some situations, at least some of the operator workstations 80 may be remotely located, but nonetheless in communicative connection with the plant 5. The operator workstations 80 may be wired or wireless computing devices.

The example process control system 5 is further illustrated as including a configuration tool or application 81 (stored in a memory of and executed on a processor of at least one of the operator workstations 80) and one or more configuration databases 82, each of which is also communicatively connected to the data highway 10. As discussed above, various instances of the configuration tool or application 81 may execute on one or more computing devices to enable users to create or change process control modules (38) and/or safety system modules (76), to configure shadowing devices to have knowledge of their respective shadowed devices, and to download these configured modules, shadowing, and support mechanisms via the data highway 10 to the controllers 11, the safety logic devices 72, one or more of the field devices 15-22, 40-46, 48, 50, the safety field devices 74, and/or other nodes of the process plant 5, as well as enable users to create or change operator interface display modules executed on operator interface devices via which an operator is able to view the process plant 5, view data, and change data settings within the process control routines 38, the safety system routines 76, the field devices 15-22 and 40-46, 58, 50, 74 of the plant 5, etc. The one or more configuration databases 82 store the created (e.g., configured) control and safety system modules and/or operator interface display modules or routines. If desired, the configuration application 81 and the configuration database 82 may be centralized and have a unitary logical appearance to the process control system 5, although multiple instances of the configuration application 81 may execute simultaneously within the process control system 5, and the configuration database 82 may be implemented across multiple physical data storage devices and multiple database arrangements. However, for ease of reading, and not for limitation purposes, the one or more configuration databases 82 are referred to herein using the singular tense.

If desired, the user interface display devices for the configuration system may be different than the operator workstations 80, as the user interface device for the configuration system are utilized by configuration and development engineers irrespective of whether or not the plant 5 is operating in real-time, whereas the operator workstations 80 are generally utilized by control and safety system operators during real-time operations of the process plant 5 (also referred to interchangeably herein as "run-time" or "on-line" operations of the process plant 5), e.g., while the process plant 5 is actively executing one or more processes within the physical field environment to generate physical products and/or materials. For example, during on-line operation of the plant 5, one or more of the operator workstations 80 may implement a user interface application 95 that provides a user, such as a control system operator, with a view of various equipment and real-time data associated with the equipment, such as on-line measurements, sensed data, and/or statuses, alarms and warnings, etc.

The example process control system 5 also includes a data historian application 83 and a data historian database 84, each of which is also communicatively connected to the data highway 10. The data historian application 83 operates to collect some or all of the data provided across the data highway 10, and to historize or store the data in the historian database 84 for long term storage. Similar to the configuration application 81 and the configuration database 82, the data historian application 83 and the historian database 84 may be centralized and have a unitary logical appearance to the process control system 5, although multiple instances of a data historian application 83 may execute simultaneously within the process control system 5, and the data historian database 84 may be implemented across multiple physical data storage devices.

In some configurations, the process control system 5 includes one or more other wireless access points 85 that communicate with other devices using other wireless protocols, such as Wi-Fi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, or other wireless communication protocols. Typically, such wireless access points 85 allow handheld or other portable computing devices (e.g., user interface devices 86) to communicate over a respective wireless process control communication network that may be different from the wireless network 70 and that may support a different wireless protocol than the wireless network 70. For example, the wireless or portable user interface device 86 may be a mobile workstation or diagnostic test equipment that is utilized by an operator or by maintenance personnel within the process plant 5 (e.g., an instance of one of the operator workstations 80). In some scenarios, in addition to portable computing devices, one or more process control devices (e.g., the controllers 11, the field devices 15-22, or wireless devices 40-46, 48, 50) also communicate using the wireless protocol supported by the access points 85.

In some configurations, the process control system 5 includes one or more gateways 87, 88 to systems that are external to the immediate process control system 5. Typically, such systems may be provided for consumers or suppliers of information generated by or operated on by the process control system 5. For example, the process control plant 5 may include a gateway node 87 to communicatively connect the immediate process plant 5 with another process plant. Additionally or alternatively, the process control plant 5 may include a gateway node 88 to communicatively connect the immediate process plant 5 with an external public or private system, such as a laboratory system (e.g., Laboratory Information Management System or LIMS), an operator rounds database, a materials handling system, a maintenance management system, a product inventory control system, a production scheduling system, a weather data system, a shipping and handling system, a packaging system, the Internet, another provider's process control system, or other external systems.

It is noted that although FIG. 1 only illustrates three controllers 11 with a finite number of field devices 15-22, 40-46, 48, 50, wireless gateways 35, wireless adaptors 52, access points 55, routers 58, wireless process control communications networks 70, safety system logic devices 72, and safety system field devices 74 included in the example process plant 5, this example is only an illustrative and non-limiting embodiment. Any number of controllers 11 and/or safety logic devices 72 may be included in the process control plant or system 5, and any of the controllers 11 and safety logic devices 72 may communicate with any number of wired or wireless devices and networks 15-22, 35, 40-46, 48, 50, 52, 55, 58, 70, and 74 to control a process in the plant 5.

Further, it is noted that the process plant or control system 5 of FIG. 1 includes a physical field environment 90 (e.g., the process plant floor) and a back-end environment 92 which are communicatively connected by the data highway 10. As depicted in FIG. 1, the field environment 90 includes physical components (e.g., process control devices, field devices, I/O networks, network elements, etc.) that are disposed, installed, and interconnected therein to operate to control the process during run-time. For example, the controller 11, the I/O cards 26, 28, the field devices 15-22, and other devices and network components 35, 40-46, 48, 50, 52, 55, 58, 70 and the safety logic solvers 72 and safety devices 74 are located, disposed, or otherwise included in the physical field environment 90 of the process plant 5. Generally speaking, in the physical field environment 90 of the process plant 5, raw materials are received and processed using the physical components disposed therein to generate one or more products or materials.

The back-end environment 92 of the process plant 5 includes various components such as computing devices, operator workstations, databases or databanks, etc., that are typically shielded and/or protected from the harsh conditions and materials of the field environment 90. Referring to FIG. 1, the back-end environment 92 includes, for example, the operator workstations 80, the configuration or development systems 81, 82 for control modules and other executable modules, the data historian systems 83, 84, and/or other centralized administrative systems, computing devices, and/or functionality that support the run-time operations of the process plant 5. In some configurations, various computing devices, databases, and other components and equipment included in the back-end environment 92 of the process plant 5 may be physically located at different physical locations, some of which may be local to the process plant 5, and some of which may be remote.

With particular regard to generic shadowing, any one or more of the process control devices of the process plant 5 (and optionally, other devices included in the process plant 5) may be configured to support generic shadowing. That is, any process control device or other device included in the process plant 5 may be configured to be a shadowing device, and any process control device or other device included in the process plant 5 may be configured to be a shadowed device. For example, each of the process controllers 11, field devices 40-46, 48, 50, safety system controller 72, safety system field devices 74, and/or I/O devices 26, 28 may be respectively configured to support generic shadowing if desired, e.g., by using any one or more of the techniques described herein. For instance, in FIG. 1, devices 11, 15, 22, 72, and 74 are denoted as supported generic shadowing, per the encircled GSD indicator. Further, it is not necessary for all process control devices of a process control system to be configured to support generic shadowing. In some implementations, both generic shadowing and pre-configured shadowing techniques may be implemented within a process plant 5. For example, a process control system may include a first set of process control devices that are configured to support generic shadowing, and a second set of process control devices that are configured to utilize pre-configured shadowing, as is described in more detail below.

Figure 2:
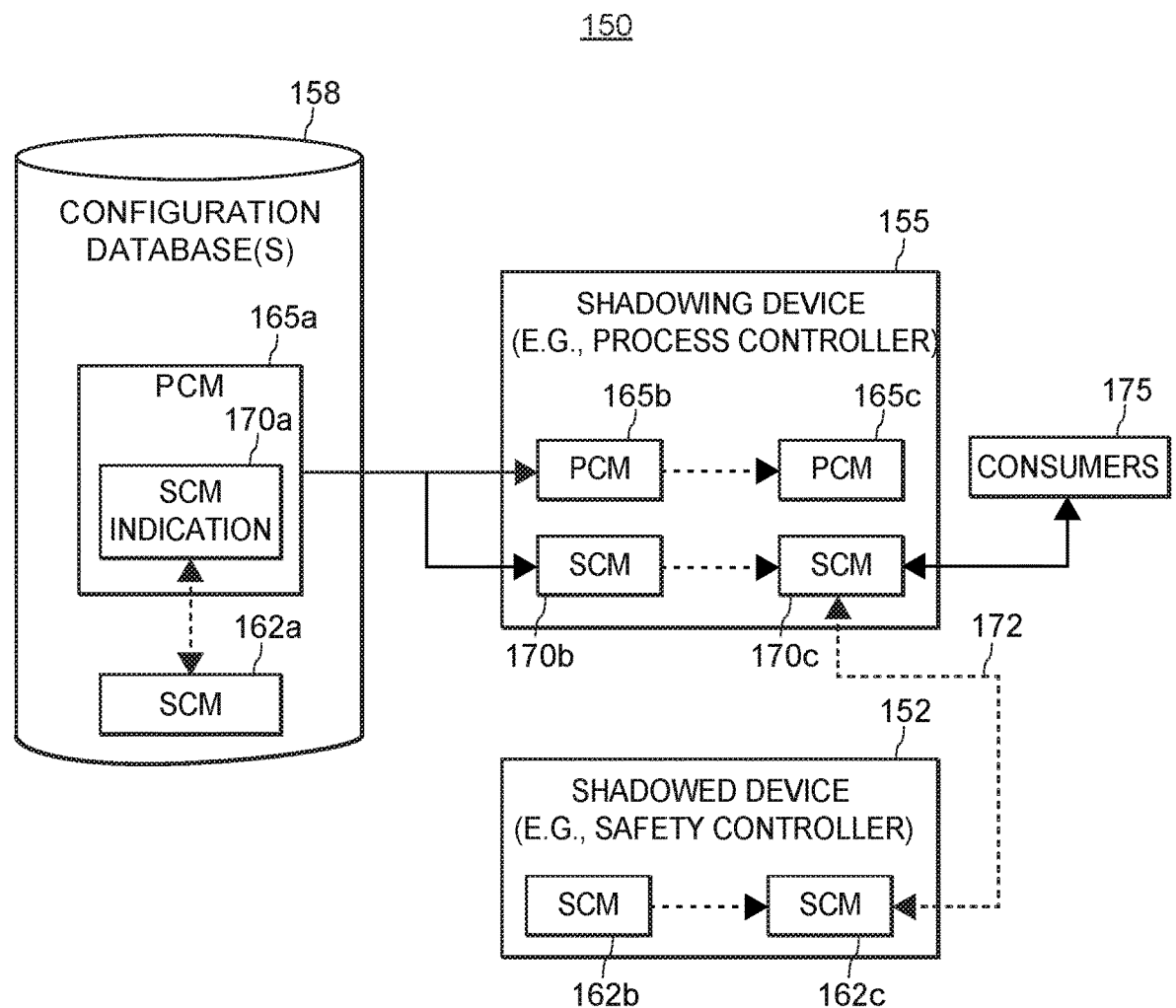
FIG. 2 depicts a block diagram of an example system for pre-configured shadowing in process control systems.

FIG. 2 is a block diagram depicting an example architecture or system 150 for pre-configured shadowing in process control systems. The example pre-configured shadowing architecture or system 150 may be implemented in the process plant 5 of FIG. 1, in an embodiment, and is described below with simultaneous reference to FIG. 1 for ease of illustration (and not for limitation) purposes.

As shown in FIG. 2, the example architecture 150 for pre-configuring shadowing devices includes a shadowed device 152, a shadowing device 155, and one or more configuration databases 158. In FIG. 2, the shadowed device 152 is depicted as a safety controller and a shadowing device 155 is depicted as a process controller; however, it is understood that each of the shadowed device 152 and the shadowing device 155 may be any desired process control device, such as a process controller, a field device, an I/O device, a safety controller, a safety logic solver, an isolated software module, etc. The one or more configuration databases 158 (which may be, for example, the configuration database 82 shown in FIG. 1) store therein the respective configurations 162*a*, 165*a* for the shadowed device 152 and the shadowing device 155. The configurations 162*a*, 165*a* are pre-defined, e.g., by a user or control engineer by using a configuration tool, such as the configuration application 81. Specifically, the configurations 162*a*, 165*a* are defined and stored into the one or more configuration databases 158 prior to the shadowed device 152 and the shadowing device 155 performing on-line operations within the process plant 5. It is noted that, similar to the configuration database 82 of FIG. 1, the one or more configuration databases 158 of FIG. 2 are referred to herein using the singular tense for ease of reading (and not limitation) purposes.

The configuration 162*a* of the safety controller or shadowed device 152 is defined or configured to include, for example, a safety control module configuration or definition SCM. As such, when the configuration 162*a* of the safety controller 152 is downloaded into the host safety controller 152 (as represented by reference 162*b*), the safety control module definition SCM is instantiated into an executable safety control module 162*c*, so that during on-line or real-time operations, the safety controller 152 operates in accordance with the executing safety control module 162c.

The configuration 165a of the process controller or shadowing device 155 that is pre-defined and stored in the configuration database 158 includes definitions of real-time attributes and behaviors of the process controller/shadowing device 155, e.g., a process control module configuration or definition PCM. Additionally, the configuration 165a of the process controller/shadowing device 155 also includes or references pre-configured definitions of the shadowing responsibilities of the shadowing device 155. That is, the configuration 165a of the process controller/0 device 155 includes or references configurations of control objects that the shadowing device 155 is to shadow during on-line operations, where the configurations of the control objects that are to be shadowed are also stored in the configuration database 158. As particularly shown in example architecture 150 of FIG. 2, the configuration 165a of the shadowing device 155 includes an indication 170a of the safety control module configuration or definition SCM that is to be shadowed by the process controller/shadowing device 155 during its real-time or on-line operations. In an implementation, the SCM indication 170a includes a copy or other representation of (or a pointer to, or similar) to the safety control module definition SCM. Alternatively, the SCM indication 170a includes copy or other representation of (or a pointer to, or similar) selected portions of the safety control module definition SCM. Significantly, though, the indication 170a of the safety control module definition SCM that is to be shadowed indicates the definitions of the data structures and data types (e.g., formats, syntaxes, values, etc.) which are utilized by the safety control module SCM and that are to be shadowed by the process controller/shadowing device 205.

The configuration 165a of the process controller PCM is downloaded into the host process controller 155 (as denoted by reference 165b), and instantiated into an executable process control module 165c so that process controller 155 operates in accordance with the executing PCM 165c. Additionally, in conjunction with the download of the PCM configuration 165b, the safety control module definition SCM or portions thereof indicated 170a in the PCM configuration are also downloaded to the shadowing device 155, as denoted by the reference 170b. Based on the received SCM configuration or definition 170b, a shadow 170c of the safety control module 162c is instantiated at the shadowing device 155, so that during on-line or real-time operations of the shadowing device 155, the shadow safety control module 170c executing at the shadowing device 155 is able to understand, mirror, and provide real-time or dynamic data that is received, generated, and/or otherwise observed by the instantiated safety control module SCM 162c executing at the shadowed device 152 (denoted in FIG. 2 by reference 172). For example, the shadow safety control module 170c at the shadowing device 155 may provide mirrored data that is observed first-hand by the safety control module SCM 162c to user interfaces, other devices, other function blocks, and/or other consumers 175 of such data within the process plant 5.

Thus, in the pre-configured shadowing architecture 150, a high degree of coupling between the shadowed device 152, the shadowing device 155, and the configuration database 158 is required. In particular, knowledge of control object configurations and definitions (including utilized data types) and knowledge of which particular device is to shadow which other particular device(s) must be defined and configured a priori. That is, the configuration of the shadowing device 155 is defined and configured to indicate the configurations of the control objects that it is to shadow during on-line operations.

On the other hand, using the novel shadowing techniques, methods, systems, apparatuses and devices described herein, a shadowed device and a shadowing device are decoupled during configuration, so that a shadowing device need not be configured with and/or have prior knowledge of control objects that are to be shadowed and their respective configurations. Further, the novel shadowing techniques, methods, systems, apparatuses and devices described herein do not require a priori knowledge (e.g., knowledge at configuration time) of data types that are utilized by shadowed devices.

Figure 3:
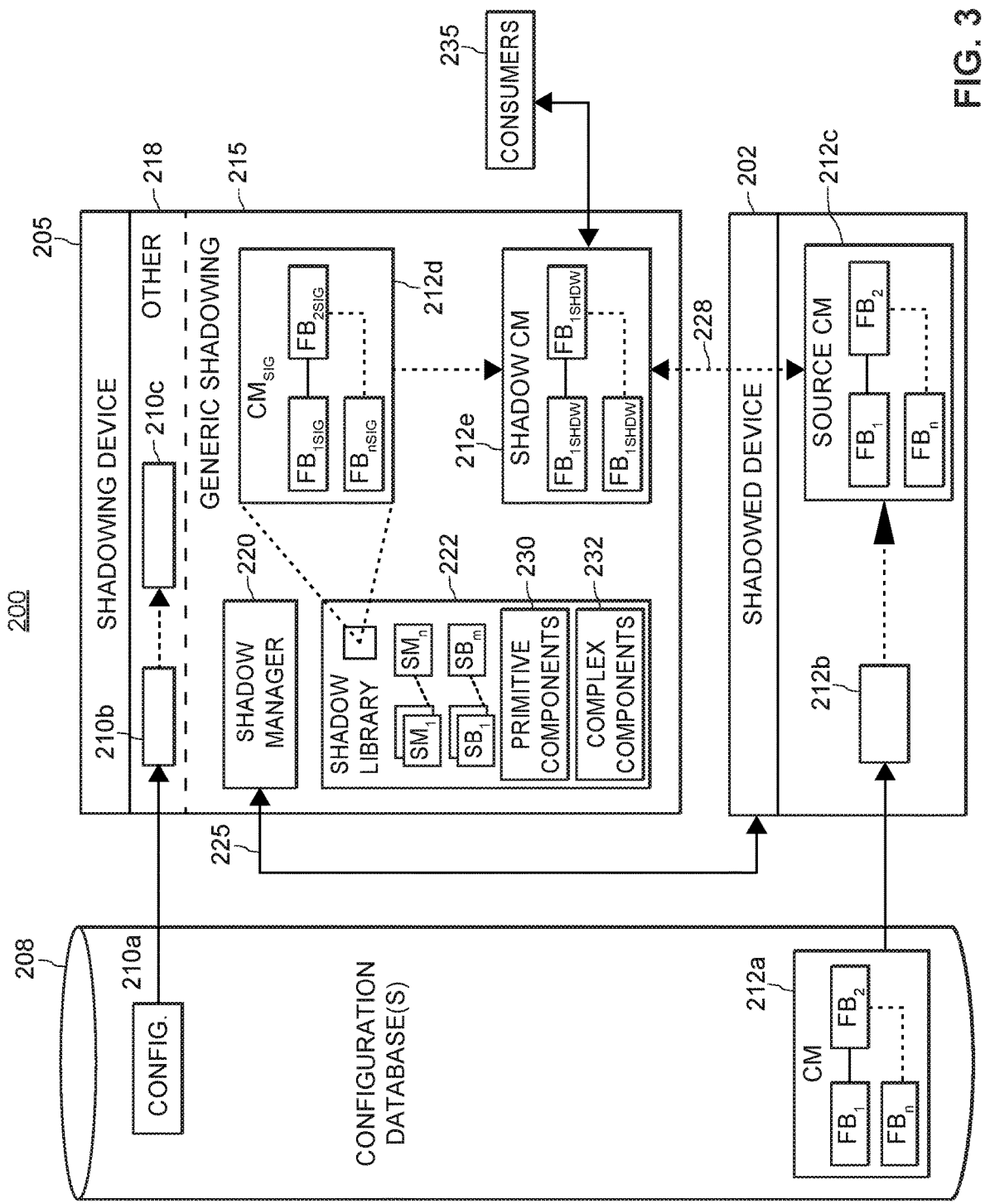
FIG. 3 depicts a block diagram of an example system for generic shadowing in process control systems.

To illustrate, FIG. 3 includes a block diagram depicting an example architecture or system 200 for generic shadowing in process control systems. The generic shadowing architecture or system 200 may support any one or more of the novel generic shadowing techniques discussed herein. In an example, the architecture 200 is implemented in the process plant 5 of FIG. 1 to perform any one or more of the novel generic shadowing techniques discussed herein. Generally speaking, though, the architecture 200 may be utilized for generic shadowing in any process control system of any process plant, e.g., in one or more Distributed Control Systems (DCSs), Safety Instrumented Systems (SISs), and/or Programmable Logic Controllers (PLCs) of a process plant, for example.

As depicted in FIG. 3, the example generic shadowing architecture 200 for process control systems or plants includes a shadowed device 202, shadowing device 205, and one or more configuration databases 208. The shadowed device 202 and the shadowing device 205 may be any desired process control device, such as a process controller, a field device, an I/O device, a safety controller, a safety logic solver, an isolated software module, etc. The one or more configuration databases 208 may be, for example, the configuration database 82 shown in FIG. 1, or some other database(s) in which configurations of various process control equipment and/or devices are stored. In some implementations, at least a portion of the one or more configuration databases 208 included in the generic shadowing architecture 200 and at least a portion of the configuration database 158 of the pre-configured shadowing architecture 150 may be a common, integral database, although this is not required. For ease of discussion, and not for limitation purposes, the generic shadowing architecture or system 200 is discussed below with simultaneous reference to the process plant 5 of FIG. 1. Additionally, it is noted that, similar to the configuration database 82 of FIG. 1, the one or more configuration databases 208 of FIG. 3 are referred to herein using the singular tense for ease of reading (and not limitation) purposes.

Similar to the pre-configured shadowing architecture 150 of FIG. 2, in the generic shadowing architecture 200, the configuration database 208 stores the configuration 212a of the shadowed device 202, where the configuration 212a defines how the shadowed device 202 is to operate when on-line. Typically, the configuration 212a of the shadowed device 202 is pre-defined and stored in the configuration database 208 by a control engineer using a configuration tool, such as the configuration application 81, and the configuration 212a is defined and stored in the configuration database 208 prior to the shadowed device 202 performing on-line operations within the process plant 5. As shown in FIG. 3, the example configuration 212a of the shadowed device 202 includes the definition or configuration of a control module CM which includes a particular arrangement of a number of particular function blocks FB1-FBn. The control module configuration 212a is downloaded into the shadowed device 202 (as represented by the reference 212b) and is instantiated at the shadowed device 202 into an executable control module 212c, so that the shadowed device 202 operates in accordance with the executing control module 212c during its on-line or real-time operations in the process plant 5. The shadowed device 202 may be a process controller, a safety controller, a field device, or other process control device, for example.

Unlike the pre-configured shadowing architecture 150 of FIG. 2, though, in the generic shadowing architecture 200 the configuration database 208 and, in particular, the configuration 210a of the shadowing device 205, do not store an indication of which source control objects (e.g., which source control modules and/or source function blocks) are to be shadowed by the shadowing device 205. That is, the relationship between shadowing device 205 and shadowed device 202 is not pre-configured, and the shadowing device 205 is not configured with any indication of the configuration of the shadowed device 202 or source control objects therein. Instead, such shadowing responsibilities and respective configurations of source control objects that are to be shadowed by the shadowing device 205 are automatically discovered by the shadowing device 205 without requiring a pre-defined indication or definition of said relationship to be configured and stored at the configuration database 208, and without requiring the configuration database 208 to serve as an intermediary between the shadowed and shadowing devices 202, 205. Specifically, as shown in FIG. 3, a configuration 210a of the shadowing device 205 that defines the other, non-shadowing attributes and on-line behaviors of the device 205 is stored in the configuration database 208, downloaded into the shadowing device 205 (reference 210b), and instantiated (reference 210c). However, the configuration 210a that particularly defines the non-shadowing behavior of the shadowing device 205 is not required to—and in most cases, does not—include any indications of shadowing targets of the shadowing device 205. That is, a configuration 210a of the shadowing device 205 is not required to—and in most cases, does not—include any indications and/or definitions of source control objects that the shadowing device 205 is to shadow during on-line operations. Rather, shadowing responsibilities of the shadowing device 205 are discovered by the shadowing device 205 utilizing generic shadowing components 215, as is described below.

As shown in FIG. 3, the shadowing device 205 includes a generic shadowing portion 215 and a portion that does not include generic shadowing 218. The generic shadowing portion 215 includes a shadow manager 220 and a shadow library 222. In an embodiment, the definitions or configurations of the shadow manager 220 and/or of the shadow library 222 are specified by the configuration 210a of the shadowing device 205. In another embodiment, the shadowing device 205 is pre-configured (e.g., by the manufacturer, or at some time prior to the installation of the shadowing device 205 in the field 92) with the shadow manager 220 and/or with the shadow library 222. The shadow manager 220 may comprise, for example, a set of computer-executable instructions stored on one or more tangible, non-transitory memories that are included in the shadowing device 205, and that are executable by one or more processors included in the shadowing device 205. For example, the shadow manager 220 may be stored on a memory on which the configuration 210b of the shadowing device 205 is stored, and may be executed by the one or more processors that execute the instantiated configuration 210c of the shadowing device 205. Generally speaking, the shadow manager 220 discovers and administrates configurations of source control objects (or portions thereof) that are to be shadowed at the shadowing device 205. For example, the shadow manager 220 discovers source control module and/or source function block definitions that are to be shadowed by the shadowing device 205 as well as the respective data types utilized therein.

Discovered information is stored in the shadow library 222 corresponding to the shadowing device 205. The shadow library 222 may comprise one or non-transitory, tangible memories or data storage devices that are included in the shadowing device 205 or that are accessible (e.g., locally and/or remotely) to the shadowing device 205. In one implementation, the shadow library 222 is stored on one or more memories on which the downloaded configuration 210b of the shadowing device 205 is also stored. As illustrated in FIG. 3, the shadow library 222 stores a number of shadow module definitions SM1-SMn and a number of shadow function block definitions SB1-SBm. At least some of the shadow module definitions SM1-SMn may be defined, within the shadow library 222, as being a particular arrangement of a particular number of shadow function blocks.

For ease of reading, the shadow module definitions SM1-SMn and shadow function block definitions SB1-SBm stored in the shadowed library 222 are generally referred to herein as "signatures," to thereby distinguish the shadow definitions from their source or primary, configured definitions. Thus, for example, a shadow control module definition SMx at a shadowing device 205 is referred to herein as a "signature" of a corresponding source control module definition CMx that was created and stored into the system configuration database 208 and instantiated into the shadowed device 202. As such, shadow module definitions SM1-SMn are interchangeably referred to herein as "signatures SM1-SMn of shadow modules" or "signatures SM1-SMn of shadow control modules," and shadow function block definitions SB1-SBm are interchangeably referred to herein as "signatures SB1-SBm of shadow blocks" or "signatures SB1-SBm of shadow function blocks." Accordingly, the shadow library 222 is interchangeably referred to herein as a "signature library 222," a "library of signatures 222," or a "library of shadow signatures 222." Additionally, the shadow library 222 may store other components, definitions, and configurations other than signatures, as is further described in a later section of this disclosure.

At any rate, for some source control objects that are to be shadowed, the signature of the source control object at the shadowing device 205 and the source control object's native configuration at the shadowed device 202 may be equivalent. For other control objects, the signature of the source control object at the shadowing device 205 and the source control object's native configuration at the shadowing device 202 may not be equivalent, for example, the signature of the source control object may define or indicate only a subset of the source control object's native configuration. However, the signature of the source control object is at least congruent with the source control object's native configuration, and as such defines sufficient structure, data types, and other information that are needed for the shadowing device 205 to shadow at least a portion of the data observed by the source control object executing at the shadowed device 202 during real-time or on-line operations.

Generally speaking, the shadow manager 220 accesses the shadow library 222 to obtain the signature of a shadow control object (e.g., of a shadow control module or a shadow function block), and instantiates the signature into an executable at the shadowing device 205. For example, to shadow the instantiated source control module 212c, the shadow manager 220 accesses the shadow library 222 to obtain a signature 212d of the instantiated source control module 212c, and instantiates the signature 212d into an executable shadow control module 212e at the shadowing device 205, including populating the signature 212d with appropriate data structures, data types, data values, etc. For some source control objects, the shadow manager 220 queries the shadowed device 202 to obtain additional information which may be needed to populate the signature 212d for on-line shadowing, e.g., particular objects within a module, data values, data types, data structures, etc. For these source control objects, the shadowed device 202 returns a query response including the requested information, where the response may take the form of a script that is to be run by the shadowing device 205, an XML file that is parsed by the shadowing device 205, and/or some other mechanism that may be selected, determined, or required, for example, based on the manufacturer of the shadowing device 205. The shadowing device 205 processes the query response and populates the signature 212d accordingly to thereby instantiate the shadow control object 212e. In FIG. 3, the dialog or interaction between the shadow manager 220 and the shadowed device 202 is denoted by the reference 225.

Similarly, for source control objects whose signatures are not found or stored in the shadow library 222, the shadow manager 220 may query the shadowed device 202 for information required for shadowing those source control objects, e.g., full or partial configuration definitions, particular function blocks, data structures, data types, data values, etc. The query response of the shadowed device 202 may take the form of a script that is to be run by the shadowing device 205, an XML file that is parsed by the shadowing device 205, and/or some other mechanism that may be determined or required, for example, based on the manufacturer of the shadowing device 205. The shadow manager 220 processes the query response and based on the information included in the response, the shadow manager 220 creates new signatures for the source control objects, stores them in the shadow library 222, and populates the created signatures for instantiation to thereby shadow the instantiated source control objects during real-time or on-line operations of the shadowing device 202. In FIG. 3, the dialog or interaction between the shadow manager 220 and the shadowed device 202 is represented by the reference 225.

Accordingly, with respect to the control module 212, during real-time or on-line operations the shadowing device 205 executes the shadow control module 212e, thereby allowing the shadowing device 205 to obtain, understand, and provide to consumers real-time or dynamic data that is received, generated, and/or otherwise observed by the source control module 212c during on-line operations at the shadowed device 202 in the process plant 5. That is, during real-time or on-line operations, the shadowing device 205, via the execution of the shadow control module 212e, mirrors selected dynamic data observed by the instantiated source control module 212c during its on-line operations, and provides the mirrored dynamic data to other devices and/or applications that are consumers of the data. The on-line mirroring or shadowing of the on-line source control object 212c by the shadow control module 212e is indicated in FIG. 3 by the reference 228.

As such, generally speaking, the shadow manager 220 discovers (reference 225) and populates the shadow library 222 with signatures of source control objects (e.g., with source control module signatures and/or with source function block signatures) that are to be shadowed by the shadowing device 205. The instantiated source control objects that are shadowed by the shadowing device 202 may execute at the same or different shadowed devices, for example. That is, the shadowing device 202 may shadow source control objects that are resident in different host devices. In some implementations, the shadowing device 205 shadows source control objects that are independent of each other, e.g., the shadowing device 205 may shadow a first source control module and may also shadow a separate and distinct second source control module, whose instantiations may execute in the same or different shadowed devices. Additionally or alternatively, the shadowing device 205 may shadow source control objects (e.g., source function blocks) that are running in separate modules within a same shadowed device 202. In some scenarios, the shadowing device 205 shadows a source control module in its entirety, and in other scenarios, the shadowing device 205 shadows some but not all source function blocks included in a source control module.

As such, the shadow manager 220 builds a shadow library 222 of known components, which may include signatures or definitions of source function blocks and signatures or definitions of source control modules, as well as known data types, data structures, data values, data syntaxes, and other data definitions used therein. In some implementations, the shadow library 222 is pre-populated with a set of primitive components 230 via which discovery of source control objects and data types may occur and from which discovered information may be built. For example, the set of primitive components 230 may define simple data types and their characteristics, such as floating point values and/or statuses, integer values and/or statuses, etc. These primitive components 230 may be utilized as the basis to develop or discover other, more complex data types. Accordingly, the shadow manager 220 may utilize combinations of primitive components 230 to define new, complex data types as they are discovered 225 and required to be defined. Complex components 232 defining the new complex data types may be stored in the shadow library 222, and may thus be available as a resource for use in creating, defining, and/or populating still other signatures and data types. Thus, the definition of any new component that was previously unknown to the shadowing device 205 may be completely discovered and defined 230, 232 during the discovery process 225 (e.g., without the intervention or involvement of the configuration database 208), and added to the shadow library 222. As such, and advantageously, with the generic shadowing architecture or system 200, the configuration (with respect to shadowing responsibilities) of the shadowing device 205 is independent of the configuration of the shadowed device 202. Consequently, any shadowed device 202 that supports generic shadowing may be shadowed by any shadowing device 205 that supports generic shadowing, and shadowing pairings may be automatically discovered and implemented by the devices 202, 205, e.g., after the shadowed device 202 and the shadowing device 205 have been respectively configured with their non-shadowing responsibilities and, in some scenarios, while the devices 202, 205 are operating on-line.

At any rate, discovery 225 of shadowing responsibilities may be automatically initiated by the shadowing device 205, and/or the discovery process may be automatically initiated by the shadowed device 202, as is explained below.

In one example scenario, discovery 225 is automatically initiated by the shadowed device 202. Specifically, in this example scenarios, the configuration 212a of the shadowed device 202 stored in the configuration database 208 includes an indication of which particular control objects included in the configuration 212a are to be shadowed (e.g., a self-description of one or more control objects), and optionally an indication of which particular device is to perform the shadowing. In an embodiment, the configuration 212a of the shadowed device 202 that is stored in the configuration database 208 includes therein an embedded script (not shown) which, when downloaded and instantiated at the shadowed device 202 (references 212b, 212c), automatically executes to generate the self-description and transmit the self-description to the shadowing device 205. In another embodiment, the configuration 212a includes an XML or other type of file which is parsed at the shadowed device 202 to thereby generate the self-description at the shadowed device 202. Other suitable types of mechanisms other than embedded scripts and/or XML files may be utilized as desired. Generally speaking, the mechanism by which the self-description generation is implemented via the download of the configuration 212a may be based on/in accordance with the manufacturer of the shadowing device 205. Thus, at least due to the inclusion of the shadowing self-description within its configuration 212a, the shadowed device 202 is particularly configured to support generic shadowing.

The self-description of the control objects 212c that are to be shadowed may take any suitable form. For example, the self-description may include an indication of the entire configuration 212b of the control object 212c, or may only include an indication of only a subset of the entire configuration 212b. In an embodiment, the self-description does not describe the entire configuration 212b, but merely indicates changes between the newly-downloaded configuration 212b and the configuration that was being utilized by the shadowed device 202 at the time of the download. Additionally or alternatively, the self-description includes indications of a subset of the data that is generated and/or received by the control object 212c, e.g., indications of only the particular data (e.g., particular real-time or dynamic data) that is needed by the user interfaces and/or other consumers that obtain such data from the shadowing device 205. Sending indications of subsets of the configuration 212b to the shadowing device 205 may advantageously reduce message traffic within the process control system.

At any rate, in this example scenario, upon download and instantiation of the configuration 212a at the shadowed device 202 (e.g., as indicated by the references 212b, 212c), the shadowed device 202 self-describes its particular control objects 212c that are to be shadowed to the shadowing device 205. For example, the shadowed device 202 may send a direct communication including its self-description to the shadowing device 205 when the shadowing device 205 is identified at the shadowed device 202. In another example, the shadowed device 202 may broadcast an indication of its self-description to nearby candidate shadowing devices which, in FIG. 3, includes the shadowing device 205.

In some situations, the shadowed device 202 automatically initiates discovery 225 by periodically or occasionally broadcasting or directly communicating to other devices its need for shadowing services and/or its self-described shadowed control objects. The self-descriptions may indicate the entire configuration 212b of the shadowed control object 212c, or may indicate a subset of the entire configuration 212b of the shadowed control object 212c, similar to that described above.

The shadowing device 205 processes the self-descriptions received from the shadowed device 202, e.g., by using the set of primitive components 230 and/or other components 232 that are stored in the library 222. In some cases, processing the self-descriptions includes generating or creating new data types and/or new signatures. In some cases, processing the self-descriptions includes updating existing data types and/or existing signatures. At any rate, upon processing the self-descriptions at the shadowing device 205, validated or verified data types and/or signatures are stored in the shadow library 205 (e.g., as new data types and/or signatures, and/or as updated data types and/or signatures), and the validated/verified data types and signatures are utilized to instantiate, at the shadowing device 205, shadows of source control objects that are executed during on-line operations of the shadowing device 205.

In another example scenario, the discovery 225 is automatically initiated by the shadowing device 205. For example, the shadowing device 205 periodically and/or occasionally polls or makes requests of devices that are executing source control objects that the shadowing device 205 is currently shadowing (which, in FIG. 3 includes the shadowed device 202) for any updates to configurations of the shadowed control objects, and/or to obtain configurations of other source control objects that are to be shadowed. In an embodiment, the shadowing device 205 directly requests the shadowed device 202 for an update of the shadowed control objects executing at the shadowed device 202, for example, upon initialization of the shadowing device 205, upon reception of an updated configuration of the shadowing device 205, etc. Additionally or alternatively, the shadowing device 205 may periodically and/or occasionally advertise or broadcast to neighboring devices that the shadowing device 205 is available to provide shadowing services. The shadowed device 202 responds to the polls, advertisements, broadcasts, and/or direct requests of the shadowing device 205 with self-descriptions of source control objects that are to be shadowed and/or updates thereto, if any, e.g., in a manner such as described above.

In yet another example scenario, discovery 225 is manually initiated. For example, a user command may instruct the shadowed device 202 to initiate discovery 202, or the user command may instruct the shadowing device 205 to initiate discovery 205. User-initiated discovery 202 may be reserved for selected situations, such as during commissioning and/or upon a re-boot of the shadowed device 202 or of the shadowing device 205.

As such, unlike the pre-configured architecture 150 of FIG. 2, the discovery mechanism 225 of the generic shadowing architecture or system 200 automatically discovers and defines the structures and types of data (e.g., for dynamic data that is to be mirrored or shadowed by the shadowing device 205) that are transferred between the shadowed device 202 and the shadowing device 205 during real-time operations, e.g., for dynamic data that is to be mirrored or shadowed by the shadowing device 205 during on-line operations.

However, and significantly, the generic shadowing architecture 200 does not limit how the shadow control module or object 212e appears at the shadowing device 205 to consumers of the mirrored data provided by the shadow control module 212e. For example, for some control objects, the shadowing device 205 displays and/or provides the mirrored data in its native format, e.g., in the data format defined by the configuration 212b of the instantiated control object 212c. For other control objects, the shadowing device 205 displays and/or provides the mirrored data in a format other than the format as defined by the configuration 212b of the instantiated control object 212c. For example, the shadowing device 205 may display or provide mirrored data in a format that is utilized in the host process control system in which the shadowing device 205 resides, e.g., a format that is utilized by a consumer of the mirrored data. Accordingly, the generic shadowing system 200 advantageously allows source control objects and/or source devices to be format-agnostic. That is, a same source device using a particular data format may be easily included in various process control systems that utilize different data formats without either the source device or the consuming devices needing to be pre- or re-configured, as the generic shadowing mechanism 200 automatically discovers the native data format of the source device (and is able to communicate with the source device in its native format) while presenting mirrored data originating from the source device with other devices and consumers within the process control system using the data format(s) that are understood by the other devices and consumers. With the generic shadowing mechanism 200, a source device need not be aware or have knowledge of the data formats and structures that are utilized by the process control system in which it is utilized, and vice versa.

Accordingly, turning again to the configuration of the control object 212 in FIG. 3, during real-time or on-line operations of the process plant 5, after the signature of the shadowed control object has been discovered (reference 225), stored (reference 212d), and instantiated (reference 212e) at the shadowing device 205, the shadowing device 205 executes the instantiated shadow control module 212e, thereby allowing the shadowing device 205 to obtain, understand, and provide to other devices, function blocks, applications, and/or consumers (reference 235) a mirror of real-time or dynamic data (reference 228) that is received and/or generated by the shadowed control module 212c during its on-line operations in the process plant 5. That is, during real-time or on-line operations, the shadowing device 205, via the execution of the shadowing control module 212e, provides, to other devices, function blocks, and/or applications 235, a copy of selected dynamic data 228 that is observed first-hand by the shadowed control module 212e during its on-line operations.

Figure 4:
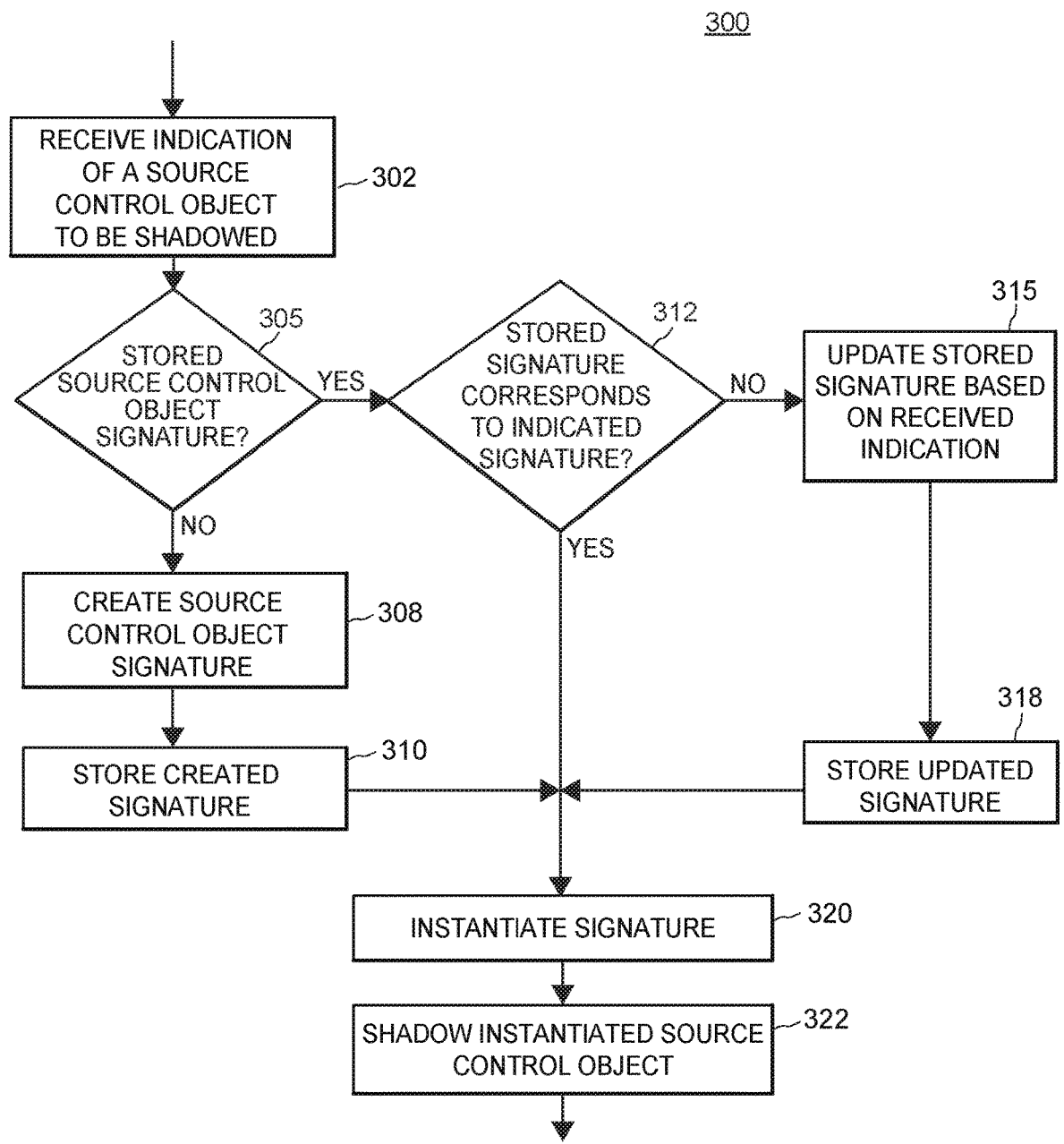
FIG. 4 illustrates a flow diagram of an example method of generic shadowing in a process plant.

FIG. 4 depicts a flow diagram of an example method 300 for generic shadowing of control objects. In an embodiment, the method 300 is performed by the shadowing device 205 of FIG. 3. In an example, at least a portion of the method 300 is performed by the shadow manager 220 of the shadowing device 205. Generally speaking, though, the method 300 may be performed in conjunction with the generic shadowing architecture 200 of FIG. 3, and/or in conjunction with any other embodiment of the novel systems, methods, apparatuses, devices, and/or techniques for generic shadowing described herein. For ease of discussion, though, and not for limitation purposes, the method 300 is described below with simultaneous reference to FIGS. 1 and 3.

As illustrated in FIG. 4, at a block 302, the method 300 includes receiving an indication that a control object (either in its entirety, or one or more changes and/or modifications thereto) has been downloaded to a shadowed device, such as the shadowed device 202. As the control object is an object that is to be shadowed, the control object is generally referred to herein as a "source control object." The source control object may be, for example, a source control module comprising a plurality of function blocks that are particularly arranged and interconnected (such as the control module 212b of FIG. 3). In some scenarios, the source control object may be a source function block which may be a part of one or more control modules. For ease of discussion and not for limitation purposes, the method 300 is described below with respect to a source function block.

The indication that a source function block has been downloaded and/or modified may be received from a shadowed device, such as from the shadowed device 202. The indication of the download/changes to the source function block may be sent from the shadowed device 202 to the shadowing device 205, for example, upon the receipt and/or instantiation of the download/changes at the shadowed device 202, upon a periodic and/or occasional poll, request, and/or broadcast by either the shadowed device 202 or the shadowing device 205, upon receipt of a manual command, etc., such as previously described.

At a block 305, the method 300 includes determining whether or not a signature of the source function block is available, known, or stored. For example, the shadowing device 205 determines whether or not a signature of the source function block is stored in the shadow library 222.

If, at the block 305, the method 300 determines that a signature corresponding to the source function block is not stored in the shadow library 222 (e.g., the "NO" leg of the block 305), the method 300 may create the signature of the function block (block 308) and store the created function block signature (block 310) so that the function block signature is accessible to the shadowing device 205. For instance, the created function block signature is stored in the shadow library 222, which may be local to or integral with the shadowing device 205, or may be implemented on one or more local and/or remote data storage devices (not shown) that are accessible to the shadowing device 205.

In an embodiment, creating the signature of the source function block (block 308) includes creating the signature of the source function block by utilizing one or more primitive components 230 that are provided by or stored in the shadow library 222. The primitive components 230 may correspond to one or more data structures, one or more data formats, one or more data values, one or more data syntaxes, one or more markup languages, and/or any one or more definitions of data types, which generally (but not necessarily) may be simple data types. For example, various primitive components stored in the library 222 are configured to generate signatures of floating point values and/or statuses, integer values and/or statuses, and/or values and/or statuses of other simple data types. Additionally or alternatively, various primitive components stored in the library 222 may be configured to read and/or write one or more markup languages to thereby determine utilized data types, which may be (but are not necessarily) simple data types. Accordingly, in scenarios in which the source function block signature utilizes one or more complex data types, creating the signature of the source function block includes discovering or creating the one or more complex data types based on one or more simple data types by utilizing respective primitive components provided by the library 222. The one or more discovered and/or created complex data types 232 may be stored in the shadow library 222 so that they are available or accessible and/or so that they may be utilized to define other control object signatures. In some embodiments, a respective function, script, or equivalent configured to generate a newly discovered/created complex data type 232 (e.g., a "complex component") may also be created and stored in the shadow library 222, e.g., for utilizing in generating another instance of the complex data type for another signature.

If, at the block 305, the method 300 determines that a signature corresponding to the source function block is stored in the shadow library 222 (e.g., the "YES" leg of the block 305), the method 300 compares (block 312) the stored signature with the signature that was received and indicated at the block 302. If the two signatures match or otherwise are congruent (e.g., the "YES" leg of the block 312), the stored signature of the source function block is verified against the most current signature, e.g., the signature indicated by the received indication at the block 302.

If, at the block 312, the method 300 determines that the stored signature and the indication of the downloaded/modified source function block indicated at the block 302 do not match or are not congruent (e.g., the "NO" leg of the block 312), the stored signature is updated or modified based upon the received indication (block 315), and the updated signature is stored (block 318), e.g., in the shadow library 222.

At any rate, upon creation, verification, or modification of the signature of the source function block (e.g., via the block 310, 312, and/or 318), the signature of the source function block is instantiated (block 320) at the shadowing device 205 and executed to thereby shadow (block 322), at the shadowing device 205, the instantiated source function block that is executing at the shadowed device 202. Instantiating the signature of the source function block (reference 320) may include populating the signature based upon the configuration or definition indicated by the block 302, and/or may include initiating a dialog with the shadowed device 202 to obtain population information (reference 225), for example. At any rate, when shadowing the instantiated source function block (reference 322), the shadow 212e of the source function block provides shadowed or mirrored real-time or dynamic data (reference 228) and other information that is received, generated, and/or otherwise observed by the instantiated source function block 212c to user interfaces, display views, and/or other consumers 235 of such data within the process control system.

Optionally, the method 300 may include verifying that communications between the shadowing device 205 and the shadowed device 202 are of sufficient fidelity (not shown). That is, the method 300 may include verifying that the shadowed device 202 is communicatively accessible to the shadowing device 205. If a loss of communications is detected, or if the quality of communications degrades below a threshold, the shadowing device 205 may generate an alarm or an alert indicative of the loss or degradation of communications between the devices 202, 205, and the alarm or alert is presented at a user interface. It is noted that other types of alarms and/or alerts that are natively generated by the shadowed device 202 may be mirrored at the shadowing device 205 for presentation at user interfaces and/or delivery to other function blocks, modules, application, and/or devices in the process control system. As such, any dialogue with recipients of the mirrored alarm and/or alert data provided by the shadowing device 205 and/or special alarm handling (e.g., different alarm priorities, alarm/alert acknowledgement philosophies, etc.) may be performed by the shadowing device 205, e.g., as defined by the shadow 212e of the source control object.

Optionally, the method 300 may include synchronizing, auditing, and/or verifying the accuracy of the signatures and other components that are stored in the shadow library 222 with their source control objects and devices. For example, periodically, occasionally, and/or on-demand, the shadow manager 220 initiates a synchronization, audit, or verification process with one or more shadowed devices and/or source control objects. Said synchronization, audit, and/or verification process may be similar to that utilized when the shadowing device 205 initiates discovery 225. That is, the shadowing device 205 may send a verification query to the shadowed device 202, and the shadowed device 202 may respond with a response indicating corresponding configurations of the corresponding, instantiated source control objects (or selected portions thereof) that are to be shadowed at the shadowing device 205. The response may take the form of a script that is to be run by the shadowing device 205, an XML file that is parsed by the shadowing device 205, and/or some other mechanism that may be determined or required, for example, by the manufacturer of the shadowing device 205. The shadowing device 205 processes the query response, and subsequently creates, deletes, updates, and/or modifies signatures and other components stored in the shadow library 222 based upon the contents of the response. In an embodiment, at least some of the blocks 302-318 of the method 300 may be executed to synchronize, audit, and/or verify the signatures and components that are stored in the shadow library 222.

Further, the method 300 may be easily extended to shadowing source control objects that are control modules. For example, a respective instance of the method 300 may be performed (e.g., sequentially and/or in parallel) for each function block included in a source control module that is to be shadowed, and an instance of the method 300 may be performed for the source control module as a whole to thereby generate a shadow 212e of the instantiated source control module 212c that provides mirrored real-time data and other information 228 that is received at and/or generated by the instantiated source control module 212c, e.g., to user interfaces, display views, and/or other consumers 235 of such data within the process control system.

Accordingly, in view of the discussion above, the method 300 discovers control objects (e.g., function blocks and/or control modules) that are instantiated at the shadowed device 202, including discovering the particular data types utilized therein, and creates and/or updates respective signatures of the control objects (e.g., of the source control objects) for instantiation at the shadowing device 205 and to utilize in shadowing the discovered source control objects. Importantly, with the method 300, and/or with the system 200 for that matter, source control object definitions or configurations and data types utilized therein are not required to be known by the shadowing device 205 a priori, even for shadowed devices that are custom or that are provided by various vendors. That is, while the shadowing device 205 obtains, from the configuration database 208, its own configuration 210a specifying its own on-line operations, any or all configurations of shadowing responsibilities of the shadowing device 205 (e.g., of control objects that the shadowing device 205 is to shadow during its on-line operations) may not be included or referenced in the configuration 210a of the shadowing device 205, and instead may be automatically discovered by the shadowing device 205 using at least a portion of the method 300 and/or the system 200.

Further, with the method 300 and/or with the system 200, discovery and resulting implementation of the shadowing device's shadowing responsibilities may be performed without the use of an external configuration tool (e.g., without the configuration tool 81) and without requiring the configuration database 208 to operate as an intermediary between the shadowing device 205 and the shadowed device 202. Additionally, the method 300 and/or the system 200 advantageously allows the shadowing device 205 to discover or detect when shadow signatures differ from or have discrepancies when compared to their respective source control objects, and allows for automatically correction and/or reconstruction of the instantiated shadow signatures to match or otherwise be in concurrence or congruent with the source control objects, again without the use of an external configuration tool and/or the use of the configuration database as an intermediary.

Still further, the method 300 and/or the system 200 allows data types utilized in source control objects to be of any desired type, format, structure, mark-up language, etc. That is, with the discovery mechanism of the method 300 and/or of the system 200, complex data types that are utilized in source control objects are automatically discovered and/or are automatically learned, created, or generated, e.g., based upon a combination of primitive data types indicated by a set of primitive components 230 that are available at shadowing devices 205. In some embodiments, data types that are utilized in source control objects may be negotiated, discovered, and/or defined by utilizing direct communications between the shadowed device 202 and the shadowing device 205, e.g., via the dialog 225 described above, and/or by using the set of primitive components 230. Advantageously, and as also described above, newly learned, created, and/or generated data type definitions and/or signatures may be stored in a shadow library 222 that is accessible to the shadowing device 205. As such, the shadowing device 205 does not need to re-learn or re-discover any learned, created, and/or generated data type definitions and/or signatures, with the exception, of course, of synchronizing, auditing, and/or verifying stored data type definitions and signatures with the shadowed device 202. Further, the method 300 and/or the system 200 allows for the creation and generation of complex components 232, which may be stored in the shadow library 222 and utilized as a resource in conjunction with the primitive components 230 to discover and generate other signatures and data types. In an embodiment, the set of primitive components 230 and any complex components 232 are stored in the shadow library 222.

It is noted that some process control systems may utilize both the pre-configured shadowing architecture 150 and the generic shadowing architecture 200. For example, the pre-configured shadowing architecture 150 may be utilized to implement shadowing of source devices that do not support generic shadowing, e.g., legacy source devices, while the generic shadowing architecture 150 may be utilized to implement shadowing of source devices that do support generic shadowing. As such, a particular shadowing device 205 may utilize the pre-configured shadowing mechanism 150 to shadow legacy source devices while also utilizing generic shadowing mechanisms 200 to shadow other source devices that do support generic shadowing. Thus, for a particular shadowing device 205 that is configured to support both shadowing mechanisms 150, 200, signatures and/or components corresponding to pre-configured shadowing 150 may be downloaded or obtained by the particular shadowing device 205 from the configuration database 208, while signatures and/or components corresponding to generic shadowing 200 may be discovered by the particular shadowing device 205 without communicating with the configuration database 208. At any rate, both the downloaded and the discovered signatures and/or components may be stored in the shadow library 222, and may be utilized by the particular shadowing device 205 to create, generate, and/or discover other signatures, data types, and components.

Further, the generic shadowing architecture or system 200 is extendable to transfer, via the shadowed device 202, additional data that is not related to shadowing to the shadowing device 205, and optionally to other devices, applications, modules, function blocks, and/or objects 235 within the process control system. In a sense, the shadowed device 202 and optionally the shadowing device 205 are utilized as a store-and-forward mechanism. For example, referring to FIG. 2, additional data (not shown) that is to be passed to the shadowing device 205 is configured into or with the configuration 212a of the shadowed device 202, and is downloaded to the shadowed device 202 in conjunction with the configuration of the shadowed device 202 (reference 212b). Subsequently, the additional data is stored or held at the shadowed device 202, e.g., without being manipulated or processed by the shadowed device 202. The shadowing device 205 utilizes the discovery process 225 to discover the additional data that has been stored at the shadowed device 202 and that is intended for delivery to the shadowing device 205. Similarly, via the discovery process 225, the shadowed device 202 forwards the stored additional data to the shadowing device 205. Either one of the shadowing device 205 or the shadowed device 202 may initiate the discovery process 225 for transfer of the additional, non-shadowing data. Thus, by utilizing the discovery process 225, the shadow manager 220, and shadow library 222 of the generic shadowing architecture 200, additional data is able to be delivered to and understood by the shadowing device 205 without the need for the shadowing device 205 to be configured a priori to receive and understand the additional data. Still further, in some scenarios, at least some of the additional data that is discovered and obtained by the shadowing device 205 from the shadowed device 202 may be forwarded to a recipient device, module, function block, or application 235 of the process control system for use by the recipient.

To illustrate, in an example scenario of extending the generic shadowing architecture 202 to support store and forward data handling, the additional data comprises a configuration of a graphical display view, which is stored at the configuration database 208 and downloaded in conjunction with the configuration 212a of the shadowed device 202. For instance, the graphical display view configuration may be wrapped in the configuration 212a of the shadowed device 202, or otherwise referenced therein. The graphical display view is received in conjunction with the configuration 212b at the shadowed device 202, and is held or stored (e.g., temporarily) by the shadowed device 202. Via the discovery process 225 and optionally the components stored in the shadow library 222, the shadow manager 220 obtains the configuration of the graphical display view that is being held at the shadowed device 202, and processes the configuration of the graphical display view to discover, learn, and/or understand the graphical display view's configuration and the data types utilized therein. If desired, the graphical display view configuration may be stored at the shadowing device 205 in the shadow library 222. Additionally, the graphical display view configuration may be provided by the shadowing device 205 to one or more other recipient devices, applications, modules, function blocks, etc. in the process control system to create the graphical display view for presentation on respective user interfaces.

Accordingly, as described above, the generic shadowing architecture 200 including the shadowed device 202 and the shadowing device 205 are utilized as a store-and-forward delivery mechanism via which additional data (such as configurations of third-party objects, and/or other types of additional data) are able to be delivered from the configuration database 208 to various recipient devices, applications, modules, and/or objects within the process control system, even when the recipients do not have direct access or communicative connections to the configuration database 208.

Embodiments of the techniques described in the present disclosure may include any number of the following aspects, either alone or in combination:

1. A shadowing device included in a process plant, where the shadowing device comprises one or more processors; one or more interfaces communicatively connecting the shadowing device to a shadowed device, the shadowing device and the shadowed device included in a process control system operating to control, in real-time, an industrial process in the process plant; one or more tangible memories storing a shadow library; and a shadow manager comprising computer-executable instructions that are stored on the one or more tangible memories and that, when executed by the one or more processors, cause the shadowing device to receive, from the shadowed device, an indication of a source function block that has been configured and downloaded into the shadowed device, the source function block that has been configured and downloaded into the shadowed device being an instantiated source function block.

When a signature corresponding to the source function block is not stored in the shadow library, the shadowing device is caused, by the computer-executable instructions executed by the one or processors, to (i) create, based on the received indication of the source function block, a signature of the source function block, (ii) store the created signature of the source function block in the shadow library, and (iii) instantiate the created signature of the source function block, thereby generating a shadow of the source function block at the shadowing device. Additionally or alternatively, when a signature corresponding to the source function block is stored in the shadow library, the shadow manager is caused, by the computer-executable instructions executed by the one or processors, to (i) determine, based on the received indication of the source function block, a discrepancy between the source function block and the stored signature corresponding to the source function block, (ii) update the stored signature corresponding to the source function block based on the discrepancy, (iii) store the updated signature of the source function block in the shadow library, and (iv) instantiate the updated signature of the source function block, thereby generating the shadow of the source function block at the shadowing device.

Additionally, the one or more processors of the shadowing device are configured to use the shadow of the source function block to mirror dynamic data that is observed by the instantiated source function block executing at the shadowed device during the real-time control of the industrial process in the process plant, and provide the mirrored dynamic data to one or more other devices and/or function blocks included in the process control system, thereby shadowing, by the shadowing device, the instantiated source function block executing at the shadowed device.

2. The shadowing device of the previous aspect, wherein the instantiated source function block is included in a plurality of function blocks that have been instantiated at the shadowed device; the shadow manager further causes the shadowing device to query the shadowed device for respective indications of the plurality of function blocks that have been instantiated at the shadowed device; and the indication of the instantiated source function block is included in a response to the query.

3. The shadowing device of any one of the previous aspects, wherein the query of the shadowed device for the respective indications of the plurality of function blocks that have been instantiated at the shadowed device comprises a polling of the shadowed device for the respective indications of the plurality of function blocks that have been instantiated at the shadowed device.

4. The shadowing device of any one of the previous aspects, wherein the polling of the shadowed device comprises a periodic polling of the shadowed device.

5. The shadowing device of any one of the previous aspects, wherein the indication of the instantiated source function block is received from the shadowed device upon at least one of: a download of a configuration of the source function block into the shadowed device, an instantiation of the downloaded configuration of the source function block at the shadowed device, or an execution of the instantiated source function block at the shadowed device.

6. The shadowing device of any one of the previous aspects, wherein the indication of the instantiated source function block received from the shadowed device comprises an indication of one or more types of dynamic data with which the instantiated source function block has been configured.

7. The shadowing device of any one of the previous aspects, wherein the shadow of the instantiated source function block is included in a plurality of shadows of a plurality of function blocks that have been instantiated at the shadowed device and optionally at other devices; respective signatures of the plurality of function blocks are stored in the shadow library; and the shadow manager further causes the shadowing device to synchronize the respective signatures of the plurality of function blocks that are stored in the shadow library with the plurality of function blocks that have been instantiated at the shadowed device and optionally at the other devices.

8. The shadowing device of any one of the previous aspects, wherein the one or more processors are further configured to detect, via the one or more interfaces, a loss of communication between the shadowing device and the shadowed device and generate at least one of an alarm or an alert based upon the detection of the loss of communication.

9. The shadowing device of any one of the previous aspects, wherein the source function block is included in a plurality of function blocks that have been configured and downloaded into the shadowed device as a control module, and the downloaded control module has been instantiated at the shadowed device into an instantiated source control module; and the shadow manager further causes the shadowing device to (1) when a signature corresponding to the source control module is not stored in the shadow library, (i) create, based on an indication of the instantiated source control module received from the shadowed device, a signature of the source control module, the signature of the source control module including the signature of the source function block and respective signatures of other function blocks of the instantiated source control module; (ii) store the signature of the source control module in the shadow library; and (iii) instantiate the created, stored signature of the source control module thereby generating a shadow of the source control module at the shadowing device; and/or to (2) when a signature corresponding to the source control module is stored in the shadow library, (i) determine, based on the indication of the instantiated source control module received from the shadowed device, a discrepancy between the source control module and the stored signature corresponding to the source control module; (ii) update of the stored signature corresponding to the source control module based on the discrepancy; (iii) store the updated signature of the source control module in the shadow library; and (iv) instantiate the updated signature of the source control module, thereby generating the shadow of the source control module at the shadowing device.

Additionally, the one or more processors of the shadowing device are further configured to use the shadow of the source control module to (i) mirror dynamic data that is observed by the instantiated source control module executing at the shadowed device during the real-time control of the industrial process, and (ii) provide the mirrored dynamic data to the one or more other devices and/or function blocks included in the process control system, thereby shadowing, by the shadowing device, the instantiated source control module executing at the shadowed device.

10. The shadowing device of any one of the previous aspects, wherein the shadow manager further causes the shadowing device to synchronize a plurality of control module shadows stored at the shadowing device with a plurality of control modules that have been instantiated at other devices, the plurality of control module shadows including the shadow of the source control module, the plurality of instantiated control modules including the instantiated source control module, and the other devices including the shadowed device.

11. The shadowing device of any one of the previous aspects, wherein the shadowing device is a process controller operating in real-time to control the industrial process in the process plant, and wherein the shadowed device is one of a field device controlled by the process controller, a safety controller or safety logic solver corresponding to the process controller, or another control object executing in the process control system.

12. The shadowing device of any one of the previous aspects, wherein the shadowing device comprises a software module that is integral with and isolated in the shadowed device.

13. The shadowing device of any one of the previous aspects, wherein the instantiated source function block is included in a control module executing in the process control system of the process plant.

14. The shadowing device of any one of the previous aspects, wherein the one or more interfaces further communicatively connect the shadowing device to a configuration database of the process plant; the shadow library stores a set of signatures of control objects that have been downloaded from the configuration database via the one or more interfaces; and the set of signatures a control objects that have been downloaded from the configuration database excludes the signature of the source function block.

15. The shadowing device of any one of the previous aspects, wherein the shadow manager further causes the shadowing device to query the shadowed device to determine a resolution to the discrepancy between the source function block and the stored signature of the source function block, and wherein the update to the stored signature of the shadow function block is based on a response to the query.

16. The shadowing device of any one of the previous aspects, wherein the shadow manager includes a discovery process to discover signatures of control objects, the control objects including the source function block, and the signatures of the control objects including the signature of the source function block.

17. The shadowing device of any one of the previous aspects, wherein the signature of the source function block indicates a first data type utilized by the source function block; the shadow library stores a set of primitive components that define a plurality of data types; the discovery process is configured to identify the first data type utilized by the source function block using the set of primitive components and based on the received indication of the source function block; and the shadow library is configured to store signatures of shadows that any of the plurality of data types.

18. The shadowing device of any one of the previous aspects, wherein the plurality of data types includes at least one of: one or more data structures, one or more data formats, one or more data values, one or more data syntaxes, or one or more markup languages.

19. The shadowing device of any one of the previous aspects, wherein the first data type utilized by the source function block is a complex data type; the plurality of data types defined by the set of primitive components comprises a plurality of simple data types; and the discovery process is further configured to learn the complex data type utilized by the source function block by using the set of primitive components to combine multiple simple data types.

20. The shadowing device of any one of the previous aspects, wherein the discovery process is configured to generate a complex component defining the learned complex data type and store the complex component in the shadow library.

21. The shadowing device of any one of the previous aspects, wherein the discovery process is configured to query the shadowed device to determine a data type utilized by the source function block, and wherein the signature of the source function block indicates the data type that is utilized by the source function block and that was indicated in a response to the query.

22. The shadowing device of any one of the previous aspects, wherein an indication of a particular data type utilized by the source function block is included with the indication of the instantiated source function block received from the shadowed device, and the discovery process is further configured determine the shadow of the source function block based on the particular data type.

23. The shadowing device of any one of the previous aspects, wherein the shadowing device provides at least some of the mirrored dynamic data observed by the instantiated source function block executing at the shadowed device for display at a user interface of the process control system.

24. A method for shadowing a device in a process plant, the method comprising: receiving, at a shadowing device from a shadowed device, an indication of a source function block that has been configured and downloaded into the shadowed device, the shadowing device and the shadowed device included in a process control system operating to control, in real-time, an industrial process in the process plant, and the source function block that has been configured and downloaded into the shadowed device being an instantiated source function block; determining, by the shadowing device, that a signature corresponding to the source function block is not stored at the shadowing device; based on the determination that the signature corresponding to the instantiated source function block is not stored at the shadowing device, discovering the signature of the source function block and storing the signature of the source function block in a shadow library of the shadowing device; mirroring, at the shadowing device and by using the signature of the source function block, dynamic data that is generated and/or received by the instantiated source function block at the shadowed device during real-time control of the industrial process; and providing, by the shadowing device, the mirrored dynamic data to other function blocks and/or devices included in the process control system, thereby shadowing the instantiated source function block that is executing at the shadowed device.

25. The method of the previous aspect, wherein discovering the signature of the source function block includes querying, by the shadowing device, the shadowed device to determine a data type utilized by the source function block; and generating the signature of the source function block based on a response to the query, the response indicating the data type utilized by the source function block.

26. The method of any one of aspects 24-25, further comprising receiving an indication of a data type utilized by the source function block in conjunction with receiving the indication of the instantiated source function block from the shadowed device; and wherein discovering the signature of the source function block comprises generating the signature of the source function block based on the data type utilized by the source function block.

27. The method of any one of aspects 24-26, wherein the shadowing device is included in a process controller operating in real-time to control the industrial process in the process plant, and the shadowed device is one of: a field device controlled by the process controller to control the real-time industrial process in the process plant, a safety controller or safety logic solver corresponding to the process controller, or another control object executing in the process control system of the process plant.

28. The method of any one of aspects 24-27, wherein the shadowing device comprises a software module that is integral with and isolated in the shadowed device.

29. The method of any one of aspects 24-28, further comprising obtaining, by the shadowing device from a configuration database of the process plant, a configuration of the shadowing device and a set of signatures corresponding to a set of function blocks that are to be shadowed by the shadowing device; and wherein the signature corresponding to the source function block is excluded from the set of signatures obtained from the configuration database.

30. The method of any one of aspects 24-29, wherein discovering the signature of the source function block includes utilizing, based on the reception of the indication of the source function block, a set of primitive components to discover one or more data types utilized by the source function block, the one or more data types including at least one of: a plurality of data structures, a plurality of data formats, a plurality of data values, a plurality of data syntaxes, or a plurality of markup languages.

31. The method of any one of aspects 24-30, wherein a data type utilized by the source function block is a complex data type; the set of primitive components corresponds to a plurality of simple data types; and the method further comprises learning the complex data type utilized by the source function block by using the set of primitive components corresponding to the plurality of simple data types.

32. The method of any one of aspects 24-31, further comprising generating, based on the set of primitive components, a complex component defining the learned complex data type utilized by the source function block; and storing the complex component at the shadowing device.

33. The method of any one of aspects 24-32, wherein storing the signature of the source function block in the shadow library comprises storing, in the shadow library, multiple signatures of multiple function blocks that are instantiated at the shadowed device and optionally at other devices included in the process control system.

34. The method of any one of aspects 24-33, wherein the multiple function blocks are included in a control module that is instantiated at the shadowed device, and wherein storing the multiple signatures of the multiple function blocks of the instantiated control module comprises storing a signature of the instantiated control module.

35. The method of any one of aspects 24-34, further comprising synchronizing, by the shadowing device, the signature of the source function block with the instantiated source function block executing at the shadowed device.

36. The method of any one of aspects 24-35, further comprising detecting, by the shadowing device, a loss of the communication with the shadowed device, and generating at least one of an alarm or an alert upon detecting the loss of communication.

37. The method of any one of aspects 24-36, further comprising receiving, at the shadowing device, an indication of a display view corresponding to the instantiated source function block; and providing, by the shadowing device and in accordance with a configuration of the display view, at least a portion of the mirrored dynamic data for presentation at the display view corresponding to the instantiated source function block.

38. The method of any one of aspects 24-37, further comprising receiving additional data from the shadowed device and forwarding the additional data to a recipient device included in the process control system.

39. The method of any one of aspects 24-38, wherein the shadowing device is the shadowing device of any one of the aspects 1-23.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions, or deletions may be made to the disclosed embodiments without departing from the spirit and scope of the invention. Further, although the forgoing text sets forth a detailed description of numerous different embodiments, it should be understood that the scope of the patent is defined by the words of the claims set forth at the end of this patent and their equivalents. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims and all equivalents thereof.

What is claimed:

1. A shadowing device included in a process plant, the shadowing device comprising:
   one or more processors;
   one or more interfaces communicatively connecting the shadowing device to a configuration database of the process plant and to a shadowed device, the shadowing device and the shadowed device included in the process plant, and each of the shadowing device and the shadowed device performing respective operations to control, in real-time, an industrial process in the process plant;
   one or more tangible memories storing a shadow library, the shadow library storing a set of signatures of control objects that have been downloaded from the configuration database via the one or more interfaces, the downloaded set of signatures excluding a signature of a source function block associated with the shadowed device; and
   a shadow manager comprising computer-executable instructions that are stored on the one or more tangible memories and that, when executed by the one or more processors, cause the shadowing device to:
      receive, from the shadowed device, an indication of the source function block, wherein the source function block has been configured and downloaded into the shadowed device, and the source function block that has been configured and downloaded into the shadowed device is an instantiated source function block;
      when a signature corresponding to the source function block is not stored in the shadow library, (i) create, based on the received indication of the source function block, a signature of the source function block, (ii) store the created signature of the source function block in the shadow library, and (iii) instantiate, at the shadowing device, a shadow of the source function block indicated by the created signature of the source function block; and
      when a signature corresponding to the source function block is stored in the shadow library, (i) determine, based on the received indication of the source function block, a discrepancy between the source function block and the stored signature corresponding to the source function block, (ii) update the stored signature corresponding to the source function block based on the discrepancy, (iii) store the updated signature of the source function block in the shadow library, and (iv) instantiate, at the shadowing device, a shadow of the source function block indicated by the updated signature of the source function block,
   wherein the one or more processors of the shadowing device are configured to:
      execute the instantiated, shadowed source function block at the shadowing device during the real-time control of the industrial process in the process plant, thereby generating a copy of dynamic data generated by the instantiated source function block executing at the shadowed device, the copy of the dynamic data being mirrored dynamic data; and
      provide the mirrored dynamic data to one or more other devices and/or function blocks executing in the process plant during the real-time control of the industrial process, thereby shadowing, by the shadowing device, the instantiated source function block executing at the shadowed device.

2. The shadowing device of claim 1, wherein:
   the instantiated source function block is included in a plurality of function blocks that have been instantiated at the shadowed device;
   the shadow manager further causes the shadowing device to query the shadowed device for respective indications of the plurality of function blocks that have been instantiated at the shadowed device; and
   the indication of the instantiated source function block is included in a response to the query.

3. The shadowing device of claim 2, wherein the query of the shadowed device for the respective indications of the plurality of function blocks that have been instantiated at the shadowed device comprises a polling of the shadowed device for the respective indications of the plurality of function blocks that have been instantiated at the shadowed device.

4. The shadowing device of claim 3, wherein the polling of the shadowed device comprises a periodic polling of the shadowed device.

5. The shadowing device of claim 1, wherein the indication of the instantiated source function block is received from the shadowed device upon at least one of: a download of a configuration of the source function block into the shadowed device, an instantiation of the downloaded configuration of the source function block at the shadowed device, or an execution of the instantiated source function block at the shadowed device.

6. The shadowing device of claim 1, wherein the indication of the instantiated source function block received from the shadowed device comprises an indication of one or more types of dynamic data with which the instantiated source function block has been configured.

7. The shadowing device of claim 1, wherein:
   the shadow of the instantiated source function block is included in a plurality of shadows of a plurality of function blocks that have been instantiated at the shadowed device and optionally at other devices;
   respective signatures of the plurality of function blocks are stored in the shadow library; and
   the shadow manager further causes the shadowing device to synchronize the respective signatures of the plurality of function blocks that are stored in the shadow library with the plurality of function blocks that have been instantiated at the shadowed device and optionally at the other devices.

8. The shadowing device of claim 1, wherein the one or more processors are further configured to detect, via the one or more interfaces, a loss of communication between the shadowing device and the shadowed device and generate at least one of an alarm or an alert based upon the detection of the loss of communication.

9. The shadowing device of claim 1, wherein:
   the source function block is included in a plurality of function blocks that have been configured and downloaded into the shadowed device as a control module, and the downloaded control module has been instantiated at the shadowed device into an instantiated source control module;
   the shadow manager further causes the shadowing device to:

when a signature corresponding to the source control module is not stored in the shadow library, (i) create, based on an indication of the instantiated source control module received from the shadowed device, a signature of the source control module, the signature of the source control module including the signature of the source function block and respective signatures of other function blocks of the instantiated source control module; (ii) store the signature of the source control module in the shadow library; and (iii) instantiate, at the shadowing device, a shadow of the source control module indicated by the created, stored signature of the source control module; and when a signature corresponding to the source control module is stored in the shadow library, (i) determine, based on the indication of the instantiated source control module received from the shadowed device, a discrepancy between the source control module and the stored signature corresponding to the source control module; (ii) update of the stored signature corresponding to the source control module based on the discrepancy; (iii) store the updated signature of the source control module in the shadow library; and (iv) instantiate, at the shadowing device, a shadow of the source control module indicated by the updated signature of the source control module; and the one or more processors of the shadowing device are further configured to (i) execute the instantiated, shadowed source control module at the shadowing device during the real-time control of the industrial process, thereby generating a copy of dynamic control module data generated by the instantiated source control module executing at the shadowed device, the copy of the dynamic control module data being mirrored dynamic control module data, and (ii) provide the mirrored dynamic control module data to the one or more other devices and/or function blocks executing in the process plant during the real-time control of the industrial process, thereby shadowing, by the shadowing device, the instantiated source control module executing at the shadowed device.

10. The shadowing device of claim 9, wherein the shadow manager further causes the shadowing device to synchronize a plurality of control module shadows stored at the shadowing device with a plurality of control modules that have been instantiated at other devices, the plurality of control module shadows including the shadow of the source control module, the plurality of instantiated control modules including the instantiated source control module, and the other devices including the shadowed device.

11. The shadowing device of claim 1, wherein the shadowing device is a process controller operating in real-time to control the industrial process in the process plant, and wherein the shadowed device is one of a field device controlled by the process controller, a safety controller or safety logic solver corresponding to the process controller, or another control object executing in a process control system of the process plant.

12. The shadowing device of claim 1, wherein the shadowing device comprises a software module that is integral with and isolated in the shadowed device.

13. The shadowing device of claim 1, wherein the instantiated source function block is included in a control module executing in a process control system of the process plant.

14. The shadowing device of claim 1, wherein the shadow manager further causes the shadowing device to query the shadowed device to determine a resolution to the discrepancy between the source function block and the stored signature of the source function block, and wherein the update to the stored signature of the shadow function block is based on a response to the query.

15. The shadowing device of claim 1, wherein the shadow manager includes a discovery process to discover signatures of control objects, the control objects including the source function block, and the signatures of the control objects including the signature of the source function block.

16. The shadowing device of claim 15, wherein:
the signature of the source function block indicates a first data type utilized by the source function block;
the shadow library stores a set of primitive components that define a plurality of data types;
the discovery process is configured to identify the first data type utilized by the source function block using the set of primitive components and based on the received indication of the source function block; and
the shadow library is configured to store signatures of shadows that any of the plurality of data types.

17. The shadowing device of claim 16, wherein the plurality of data types includes at least one of: one or more data structures, one or more data formats, one or more data values, one or more data syntaxes, or one or more markup languages.

18. The shadowing device of claim 16, wherein:
the first data type utilized by the source function block is a complex data type;
the plurality of data types defined by the set of primitive components comprises a plurality of simple data types; and
the discovery process is further configured to learn the complex data type utilized by the source function block by using the set of primitive components to combine multiple simple data types.

19. The shadowing device of claim 18, wherein the discovery process is configured to generate a complex component defining the learned complex data type and store the complex component in the shadow library.

20. The shadowing device of claim 15, wherein the discovery process is configured to query the shadowed device to determine a data type utilized by the source function block, and wherein the signature of the source function block indicates the data type that is utilized by the source function block and that was indicated in a response to the query.

21. The shadowing device of claim 15, wherein an indication of a particular data type utilized by the source function block is included with the indication of the instantiated source function block received from the shadowed device, and the discovery process is further configured determine the shadow of the source function block based on the particular data type.

22. The shadowing device of claim 1, wherein the shadowing device provides at least some of the mirrored dynamic data observed by the instantiated source function block executing at the shadowed device for display at a user interface of a process control system of the process plant.

23. A method for shadowing a device in a process plant, the method comprising:
obtaining, by the shadowing device from a configuration database of the process plant, a configuration of the shadowing device and a set of signatures, the obtained set of signatures excluding a signature of a source function block that has been configured and downloaded into the shadowed device, the shadowing device and the shadowed device included in a process control system of the process plant, each of the shadowing device and the shadowed device performing respective operations to control, in real-time, an industrial process in the process plant, and the source function block that has been configured and downloaded into the shadowed device being an instantiated source function block;

receiving, at the shadowing device from the shadowed device, an indication of the source function block;

determining, by the shadowing device, that a signature corresponding to the source function block is not stored at the shadowing device;

based on the determination that the signature corresponding to the instantiated source function block is not stored at the shadowing device, discovering the signature of the source function block, storing the signature of the source function block in a shadow library of the shadowing device, and instantiating, at the shadowing device, a shadow of the source function block indicated by the stored signature of the source function block;

executing the instantiated, shadowed source function block at the shadowing device during the real-time control of the industrial process in the process plant, thereby generating a copy of dynamic data that is generated and/or received by the instantiated source function block executing at the shadowed device during the real-time control of the industrial process, the copy of the dynamic data being mirrored dynamic data; and providing, by the shadowing device, the mirrored dynamic data to other function blocks and/or devices executing in the process control system, thereby shadowing the instantiated source function block that is executing at the shadowed device.

24. The method of claim 23, wherein discovering the signature of the source function block includes:
  querying, by the shadowing device, the shadowed device to determine a data type utilized by the source function block; and
  generating the signature of the source function block based on a response to the query, the response indicating the data type utilized by the source function block.

25. The method of claim 23,
  further comprising receiving an indication of a data type utilized by the source function block in conjunction with receiving the indication of the instantiated source function block from the shadowed device; and
  wherein discovering the signature of the source function block comprises generating the signature of the source function block based on the data type utilized by the source function block.

26. The method of claim 23, wherein the shadowing device is included in a process controller operating in real-time to control the industrial process in the process plant, and the shadowed device is one of: a field device controlled by the process controller to control the real-time industrial process in the process plant, a safety controller or safety logic solver corresponding to the process controller, or another control object executing in the process control system of the process plant.

27. The method of claim 23, wherein the shadowing device comprises a software module that is integral with and isolated in the shadowed device.

28. The method claim of 23, wherein discovering the signature of the source function block includes utilizing, based on the reception of the indication of the source function block, a set of primitive components to discover one or more data types utilized by the source function block, the one or more data types including at least one of: a plurality of data structures, a plurality of data formats, a plurality of data values, a plurality of data syntaxes, or a plurality of markup languages.

29. The method of claim 28, wherein:
  a data type utilized by the source function block is a complex data type;
  the set of primitive components corresponds to a plurality of simple data types; and
  the method further comprises learning the complex data type utilized by the source function block by using the set of primitive components corresponding to the plurality of simple data types.

30. The method of claim 29, further comprising:
  generating, based on the set of primitive components, a complex component defining the learned complex data type utilized by the source function block; and
  storing the complex component at the shadowing device.

31. The method of claim 23, wherein storing the signature of the source function block in the shadow library comprises storing, in the shadow library, multiple signatures of multiple function blocks that are instantiated at the shadowed device and optionally at other devices included in the process control system.

32. The method of claim 31, wherein the multiple function blocks are included in a control module that is instantiated at the shadowed device, and wherein storing the multiple signatures of the multiple function blocks of the instantiated control module comprises storing a signature of the instantiated control module.

33. The method of claim 23, further comprising synchronizing, by the shadowing device, the signature of the source function block with the instantiated source function block executing at the shadowed device.

34. The method of claim 23, further comprising detecting, by the shadowing device, a loss of the communication with the shadowed device, and generating at least one of an alarm or an alert upon detecting the loss of communication.

35. The method of claim 23, further comprising:
  receiving, at the shadowing device, an indication of a display view corresponding to the instantiated source function block; and
  providing, by the shadowing device and in accordance with a configuration of the display view, at least a portion of the mirrored dynamic data for presentation at the display view corresponding to the instantiated source function block.

36. The method of claim 23, further comprising receiving additional data from the shadowed device and forwarding the additional data to a recipient device included in the process control system.

* * * * *